United States Patent
Kastiel

(10) Patent No.: US 12,509,253 B2
(45) Date of Patent: *Dec. 30, 2025

(54) ROTOR SYSTEM

(71) Applicant: EFIX AVIATION LTD, Kadima (IL)

(72) Inventor: Efraim Kastiel, Tel Aviv (IL)

(73) Assignee: EFIX AVIATION LTD, Kadima (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/986,846

(22) Filed: Dec. 19, 2024

(65) Prior Publication Data

US 2025/0115378 A1 Apr. 10, 2025

Related U.S. Application Data

(63) Continuation of application No. 18/035,463, filed as application No. PCT/IL2021/051418 on Nov. 29, 2021, now Pat. No. 12,208,929.

(30) Foreign Application Priority Data

Nov. 30, 2020 (IL) .......................................... 279111
Jan. 17, 2021 (IL) .......................................... 280231
Apr. 20, 2021 (IL) .......................................... 282499

(51) Int. Cl.
*B64U 10/13* (2023.01)
*B64U 30/20* (2023.01)
(Continued)

(52) U.S. Cl.
CPC ............. *B64U 10/13* (2023.01); *B64U 30/20* (2023.01); *B64U 30/297* (2023.01); *B64U 50/13* (2023.01);
(Continued)

(58) Field of Classification Search
CPC ...... B64U 10/13; B64U 30/20; B64U 30/297; B64U 50/13; B64U 70/00; B64U 70/40;
(Continued)

(56) References Cited

U.S. PATENT DOCUMENTS

| | | | | |
|---|---|---|---|---|
| 3,117,745 A | * | 1/1964 | Ellis, III | B64C 27/54 244/7 C |
| 3,905,565 A | * | 9/1975 | Kolwey | B64C 27/80 244/17.23 |

(Continued)

FOREIGN PATENT DOCUMENTS

| | | |
|---|---|---|
| CN | 107757912 A | 3/2018 |
| CN | 110386248 A | 10/2019 |

(Continued)

OTHER PUBLICATIONS

International Preliminary Report on Patentability issued in PCT/IL2021/051418 on Mar. 30, 2023.

(Continued)

*Primary Examiner* — Medhat Badawi
(74) *Attorney, Agent, or Firm* — Panitch Schwarze Belisario & Nadel LLP

(57) ABSTRACT

Rotorcraft including a fuselage and at least three rotor system arms each having a rotor system. Each rotor system includes a mast having at least two rotor blades and an electric rotor motor. At least one rotor system arm includes a support mechanism for pivotally supporting a floating mast about at least one pivot axis whereby the floating mast is tillable relative to a fiducial tilt position. The floating mast has a controllable cyclic rotor blade pitch. A mast tilt measurement mechanism provides a mast tilt feedback signal regarding a measured tilt position of a floating mast relative to its fiducial tilt position. A flight control system continuously controls the at least three electric rotor motors (Continued)

and the floating masts cyclic rotor blade pitch in response to a desired input maneuver and its mast tilt feedback signal.

12 Claims, 31 Drawing Sheets

(51) Int. Cl.
*B64U 30/297* (2023.01)
*B64U 50/13* (2023.01)
*B64U 70/00* (2023.01)
*B64U 70/40* (2023.01)

(52) U.S. Cl.
CPC .............. *B64U 70/00* (2023.01); *B64U 70/40* (2023.01); *B64U 2201/10* (2023.01)

(58) Field of Classification Search
CPC ..... B64U 2201/10; B64C 27/54; B64C 27/52; B64D 45/06
See application file for complete search history.

(56) References Cited

U.S. PATENT DOCUMENTS

| | | | | |
|---|---|---|---|---|
| 4,127,244 A * | 11/1978 | Pender | ................... | B64C 21/06 |
| | | | | 416/142 |
| 6,120,251 A * | 9/2000 | Garcin | ................. | B64C 27/322 |
| | | | | 416/134 A |
| 7,270,516 B2 * | 9/2007 | Becker | ................. | B64C 27/33 |
| | | | | 416/138 |
| 7,607,892 B2 * | 10/2009 | Beroul | ................... | B64C 27/32 |
| | | | | 416/106 |
| 7,811,061 B2 * | 10/2010 | Bianchi | .................. | B64C 27/48 |
| | | | | 416/134 A |
| 7,871,044 B2 * | 1/2011 | Hursig | ................. | G05D 1/0858 |
| | | | | 244/81 |
| 8,128,034 B2 * | 3/2012 | Karem | ................... | B64C 27/08 |
| | | | | 244/175 |
| 9,058,743 B2 * | 6/2015 | Bourret | ................ | G01C 23/005 |
| 9,540,100 B2 * | 1/2017 | Dekel | .................... | G05D 1/042 |
| 9,592,908 B2 * | 3/2017 | Gentry | .................. | B64U 50/14 |
| 9,914,535 B2 * | 3/2018 | Paulos | ................... | B64C 27/57 |
| 10,046,853 B2 * | 8/2018 | Vander Mey | ........... | B64C 27/08 |
| 10,109,208 B2 * | 10/2018 | Cherepinsky | ............ | G08G 5/80 |
| 10,131,426 B2 * | 11/2018 | Judas | ....................... | B64C 3/38 |
| 10,322,796 B2 * | 6/2019 | Lee | ......................... | B64C 15/12 |
| 10,829,200 B2 * | 11/2020 | Gonzalez | ................ | B64C 27/28 |
| 10,974,826 B2 * | 4/2021 | Karem | ...................... | B64C 11/46 |
| 11,111,010 B2 * | 9/2021 | Bernard | .................. | B64C 27/26 |
| 11,148,799 B2 * | 10/2021 | Robertson | ............. | B64D 27/33 |
| 11,926,443 B2 * | 3/2024 | Kastiel | ................... | B64U 10/14 |
| 2006/0186263 A1 * | 8/2006 | Becker | .................... | B64C 27/54 |
| | | | | 244/17.25 |
| 2015/0197335 A1 * | 7/2015 | Dekel | .................... | B64U 30/10 |
| | | | | 701/5 |
| 2016/0059958 A1 * | 3/2016 | Kvitnevskiy | ........ | B64U 30/297 |
| | | | | 244/17.23 |
| 2016/0137298 A1 * | 5/2016 | Youngblood | .......... | A63H 27/12 |
| | | | | 244/17.23 |
| 2016/0214710 A1 * | 7/2016 | Brody | ..................... | B64C 27/26 |
| 2016/0311528 A1 * | 10/2016 | Nemovi | .................. | B64C 27/68 |
| 2017/0137118 A1 * | 5/2017 | Gentry | ..................... | B64D 1/02 |
| 2018/0370624 A1 * | 12/2018 | Seale | .................. | B64C 29/0033 |
| 2019/0135424 A1 * | 5/2019 | Baity | ..................... | B64U 10/25 |
| 2019/0351999 A1 * | 11/2019 | Stamps | .................. | B64U 50/19 |
| 2020/0023829 A1 * | 1/2020 | Hefner | ..................... | B64C 3/30 |
| 2022/0043465 A1 * | 2/2022 | Vander Mey | .......... | G05D 1/652 |
| 2022/0204157 A1 | 6/2022 | Vander Mey et al. | | |
| 2023/0202651 A1 * | 6/2023 | Christensen | ............ | B64C 13/18 |
| | | | | 244/7 R |
| 2023/0303271 A1 * | 9/2023 | Kastiel | .................... | B64C 27/22 |
| 2023/0348088 A1 * | 11/2023 | Besse | .................... | B64D 31/18 |
| 2024/0002078 A1 * | 1/2024 | Kastiel | .................... | B64C 27/52 |
| 2025/0115378 A1 * | 4/2025 | Kastiel | ................... | B64U 50/13 |

FOREIGN PATENT DOCUMENTS

| | | |
|---|---|---|
| CN | 110435887 A | 11/2019 |
| EP | 1995174 A2 | 11/2008 |
| EP | 2897863 A1 | 7/2015 |
| EP | 2990332 A1 | 3/2016 |
| EP | 3725680 A1 | 10/2020 |
| KR | 20200110850 A | 9/2020 |
| WO | 2016149545 A1 | 9/2016 |
| WO | 2020191489 A1 | 10/2020 |
| WO | 2022113087 A1 | 6/2022 |

OTHER PUBLICATIONS

International Search Report issued in corresponding PCT/IL2021/051418 on May 9, 2022.

* cited by examiner

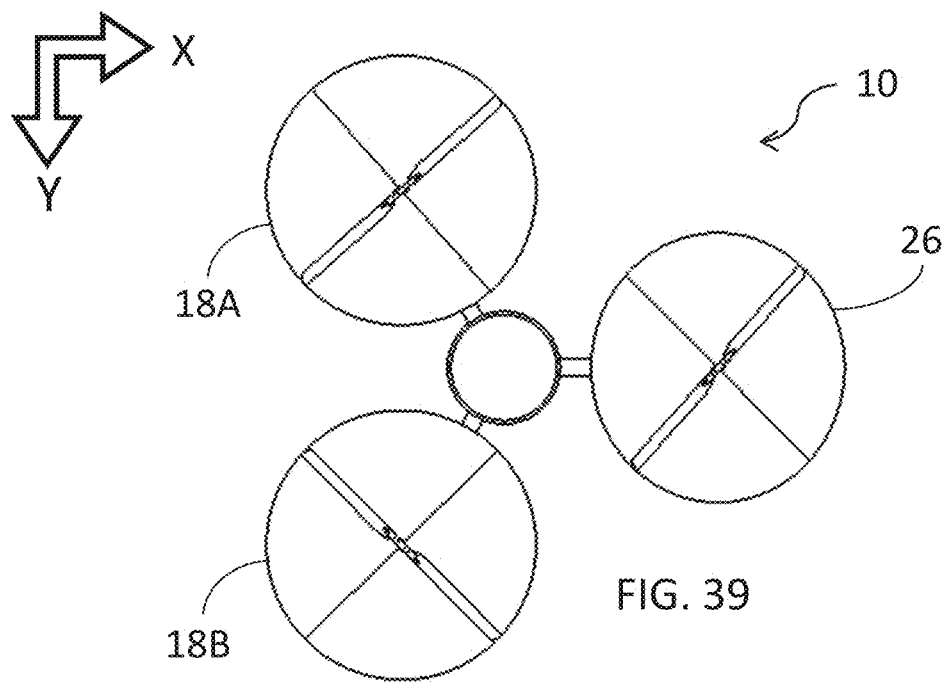
FIG. 39
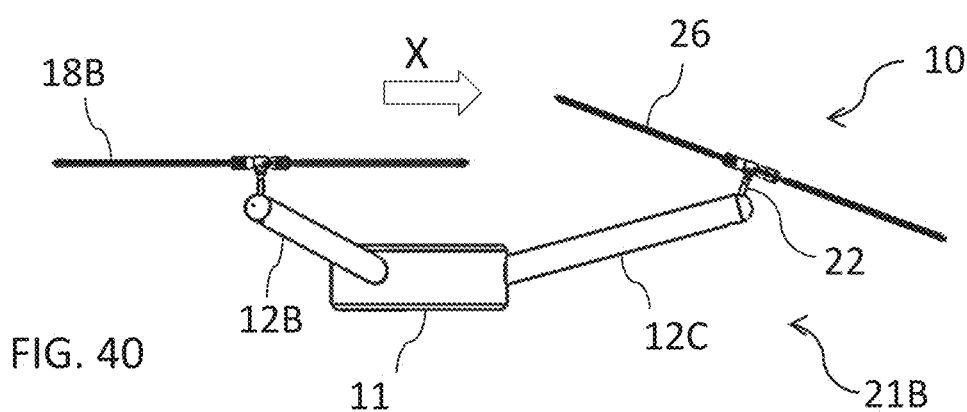
FIG. 40
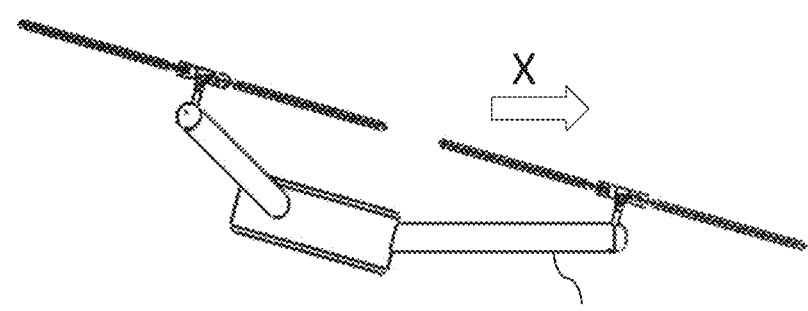
FIG. 41 – Prior Art

ROTOR SYSTEM

CROSS-REFERENCE TO RELATED APPLICATIONS

This Application is a Continuation of application Ser. No. 18/035,463 filed on May 4, 2023, which is a Section 371 of International Application No PCT/IL2021/051418, filed Nov. 29, 2021, which was published in the English language on Jun. 2, 2022, under International Publication No. WO 2022/113087 A1, which claims priority under 35 U.S.C. § 119(b) to Israeli Application No. 279111, filed Nov. 30, 2020, Israeli Application No. 280231, filed Jan. 17, 2021, and Israeli Application No. 282499, filed Apr. 20, 2021, the disclosures of each of which are incorporated herein by reference.

FIELD OF THE INVENTION

The invention relates to rotorcraft.

BACKGROUND OF THE INVENTION

Rotorcraft extend the gamut from helicopters with a single rotor system to multirotor rotorcraft having two or more rotor systems. Rotorcraft include Vertical Take-Off and Landing (VTOL) rotorcraft and Short Take-Off and Landing (STOL) rotorcraft. Input of a desired maneuver of a rotorcraft, for example, takeoff, hovering, flying to a destination, landing, and the like, can be by way of a Remote Control (RC) unit, controls operated by an onboard pilot, an autopilot, and possibly a combination of two or more thereof.

Traditional rotorcraft maneuvering requires control of a lift force component acting vertically upward to overcome weight and a thrust force component for steering purposes. Accordingly, a resultant lift-thrust force leads to tilting of a rotorcraft in a direction of flight which militates against technical performance by inter alia increasing drag, decreasing responsiveness, and the like.

There is a need for rotorcraft having improved technical and maneuvering capabilities.

SUMMARY OF THE INVENTION

The present invention is directed towards rotorcraft, components therefor, methods of operation therefor, and systems and methods for landing rotorcraft. Rotorcraft of the present invention include a fuselage having at least three preferably rigid rotor system arms mounted on the fuselage each having a rotor system, and a flight control system for controlling the rotor systems in accordance with a desired input maneuver, for example, takeoff, hovering, flying to a destination, landing, and the like. Each rotor system includes a mast having at least two rotor blades and an electric rotor motor coupled to the mast for driving the mast whereupon the at least two rotor blades act as a rotating rotor disc. One or more rotor system arms each include a support mechanism for pivotally supporting a floating mast about a single pivot axis or dual pivot axes. Dual pivot axes are preferably orthogonal. A floating mast has controllable cyclic rotor blade pitch. A floating mast optionally has controllable collective rotor blade pitch. A mast tilt measurement mechanism measures tilt of a floating mast relative to a fiducial tilt position and provides a mast tilt feedback signal regarding same.

The flight control system continuously controls the rotor systems and a floating mast's cyclic rotor blade pitch in response to the desired input maneuver and the mast tilt feedback signal wherein the continuous control of the floating mast's cyclic rotor blade pitch includes the following three steps: First, at an initial tilt position of the floating mast, actuating minor cyclic rotor blade pitch adjustments to maintain the floating mast at its initial tilt position. Second, actuating a major cyclic rotor blade pitch adjustment for tilting the floating mast from its initial tilt position to a desired tilt position. In other words, a change in a floating mast's tilt position is enabled by lift forces by virtue of a change in its cyclic rotor blade pitch as opposed to the conventional use of a servo-driven actuator. And third, upon arrival at its desired tilt position, neutralizing the major cyclic rotor blade pitch adjustment and reverting to actuating minor cyclic rotor blade pitch adjustments to maintain the floating mast at its desired tilt position. The minor cyclic rotor blade pitch adjustments at the floating mast's initial tilt position and subsequently at its desired tilt position are in order to overcome instantaneous changes e.g. changes caused by wind forces, and the like. Tilting of a floating mast by way of cyclic rotor blade pitch typically occurs over short periods of several milliseconds. Tilting of a floating mast applies a resultant force to its rotor system arm in the general direction of its tilt which in turn applies a resultant force to a rotorcraft as a whole. The resultant force on a rotorcraft as a whole depends on deployment of a rotor system arm relative to a rotorcraft's center of gravity.

Support mechanisms for pivotally supporting a floating mast about a single pivot axis can be implemented by a single bearing, a pair of opposite and parallel bearings, being slidingly supported on a single rail or a pair of opposite and parallel rails, and the like. Single axis support mechanisms pivotally support a floating mast along a single straight tilt line in a top plan view of a rotor system arm at an included angle $\alpha$ where $0° \leq \alpha \leq 180°$ with its longitudinal rotor system arm centerline. Accordingly, a single straight tilt line of a floating mast pivotally mounted on a single axis support mechanism can be fixedly set between being co-directional with a longitudinal rotor system arm centerline and perpendicular thereto. A floating mast pivotally mounted on a single axis support mechanism can be driven by an electric rotor motor either directly mounted thereon or via a conventional linkage mechanism. The support mechanisms can include damping mechanisms and/or shock absorbing mechanisms for their improved mechanical operation.

Support mechanisms for pivotally supporting a floating mast about dual pivot axes can be implemented by bearings, rails, and the like. Dual axis support mechanisms enable a floating mast to pivot along two-predetermined straight tilt lines which can each subtend an included angle $\beta$ where $0° \leq \beta \leq 180°$ relative to a longitudinal rotor system arm centerline. The two tilt lines are preferably orthogonal.

Cyclic rotor blade pitch of a floating mast's rotor blades can be implemented by either a traditional swashplate mechanism including one or more servos or alternatively as described in U.S. Pat. No. 9,914,535 to Paulos entitled Passive Rotor Control Mechanism for Micro Air Vehicles, incorporated herein by reference.

Mast tilt measurement mechanisms employ conventional tilt measuring technologies for measuring a mast tilt relative to a fiducial tilt position and providing a mast tilt feedback signal regarding same. Tilt measurements can be gravitational measurements or relative to a rotor system arm. Conventional tilt measuring technologies include inter alia gravitational accelerometers, encoder arrangements, optical arrangements, laser arrangements, and the like.

Rotorcraft of the present invention are effectively afforded one or more additional degrees of freedom for maneuvering purposes compared to traditional rotorcraft by virtue of each floating mast being individually and independently tiltable. The present invention can be implemented on either an odd number of rotor systems or an even number of rotor systems from model rotorcraft to full sized passenger and/or payload carrying rotorcraft. The present invention can also be implemented on a co-axial rotor system including either an electric rotor motor for rotating a lower mast having at least two rotor blades and an electric rotor motor for rotating an upper mast having at least two rotor blades or one an electric rotor motor that rotates both co-axial rotor systems. The number of floating masts ranges from a single floating mast to each mast being floatable. More floating masts improves a rotorcraft's technical capabilities. Some rotorcraft can preferably include single axis support mechanisms only. Other rotorcraft can preferably include dual axis support mechanisms only. Still other rotorcraft can preferably include a combination of at least one single axis support mechanism and at least one dual axis support mechanism. Implementations of support mechanisms cyclic rotor blade pitch and mast tilt measurements are dependent on a rotorcraft's intended purpose.

Rotorcraft including one or more floating masts in accordance with the present invention have considerably improved maneuverability compared to their traditional counterparts by virtue of their maneuverability being achieved by adjusting tilt of one or more floating masts as opposed to tilting an entire rotorcraft. For example, when flying to a destination, a rotorcraft can tilt its one or more floating masts forward thereby keeping its fuselage at its best aerodynamic orientation by controlling rpm and/or collective rotor blade pitch. In another example, transitioning between hovering and flight has a much faster response time and a considerable energy saving compared to a conventional comparable rotorcraft. And in a yet further example, yaw transitions are quicker compared to a conventional comparable rotorcraft.

Rotorcraft of the present invention can preferably also include a forward propulsion unit for assisting forward flight. The forward propulsion unit can be implemented as an electrical unit or a combustion unit depending on technical parameters including inter alia size, weight, maximum payload, maximum range, maximum flight time, and the like. The forward propulsion unit can be implemented by a rear mounted pusher, two or more side mounted pushers, a front mounted puller or a combination thereof. The forward propulsion unit facilitates emergency autorotation for safe emergency landings in the event of a catastrophic loss of one or more rotor systems. The forward propulsion unit also facilitates gyro-cruising similar to an auto-gyro. Such emergency autorotation and auto-cruising can be further assisted by providing the rotor systems with freewheel arrangements such that a mast can freewheel autorotate without being driven by its electric rotor motor. Freewheel arrangements can be implemented by mechanical freewheel mechanisms. Alternatively, in the case of electrical rotor system motors, a freewheel arrangement can be implemented by a non-mechanical arrangement.

Rotorcraft of the present invention preferably include aerodynamic lifting surfaces. Rotor system arms can be configured as aerodynamic wings for providing lift. Alternatively, a rotorcraft's fuselage can be provisioned with aerodynamic wings for providing lift.

Rotorcraft of the present invention can include a commercially available Airborne Collision Avoidance System (ACAS) for assisting both indoor and outdoor flight applications.

Rotorcraft of the present invention synergistically combine three traditionally separate aerodynamic concepts of helicopter, autogyros and fixed wing aircraft for providing VTOL/STOL, hovering, autogyro flight efficiency and fixed wing range, speed and payload capacity. The flight envelope of the rotorcraft of the present invention has positively overlapping flight phases as follows: taking off like a VTOL/STOL rotorcraft, accelerating and ascending like an autogyro, high-speed gyro-cruising for straight and level flight like an autogyro and/or fixed wing aircraft, decelerating and descending like an autogyro, and landing like a VTOL/STOL rotorcraft. Exemplary rotorcraft speed ranges for takeoff/landing are between about 0 knots and about 30 knots, accelerating and ascending/decelerating and descending between about 15 knots and about 80 knots, and high-speed gyro-cruising from about 60 knots to about 100 knots. The positive overlapping flight phases means transitioning between flight phases doesn't pose a risk to the rotorcraft regardless of speed and altitude potential, eliminating a helicopter's deadman's curve and guaranteeing safe flight operation at all flight phases even in the event of power loss.

BRIEF DESCRIPTION OF DRAWINGS

In order to understand the present invention and to see how it can be carried out in practice, preferred embodiments will now be described, by way of non-limiting examples only, with reference to the accompanying drawings, in which similar parts are likewise numbered, and in which:

FIG. 39 is a top plan view of a tricopter with one dual axis support mechanism in forward flight;

FIG. 40 is a front elevation view of the FIG. 39 tricopter;

FIG. 41 is a front elevation view of a conventional tricopter in forward flight;

DETAILED DESCRIPTION OF PRESENT INVENTION

The detailed description of the drawings is divided into the following six sections:

Section 1: Rotorcraft with Floating Mast

Section 2: Single Axis and Dual Axis Support Mechanisms for Pivotally Supporting Floating Masts Section 3: Cyclic Rotor Blade Pitch Controls
Section 4: Rotorcraft with Forward Propulsion Unit
Section 5: Rotorcraft Steering and Rotorcraft Maneuvers
Section 6: Technical Benefits of Rotorcraft with Forward Propulsion Unit and one or more Floating Masts Section 1: Rotorcraft with Floating Mast For illustrative purposes only, the present invention is now described with respect to a tricopter having a single floating mast.

Figure 1A:
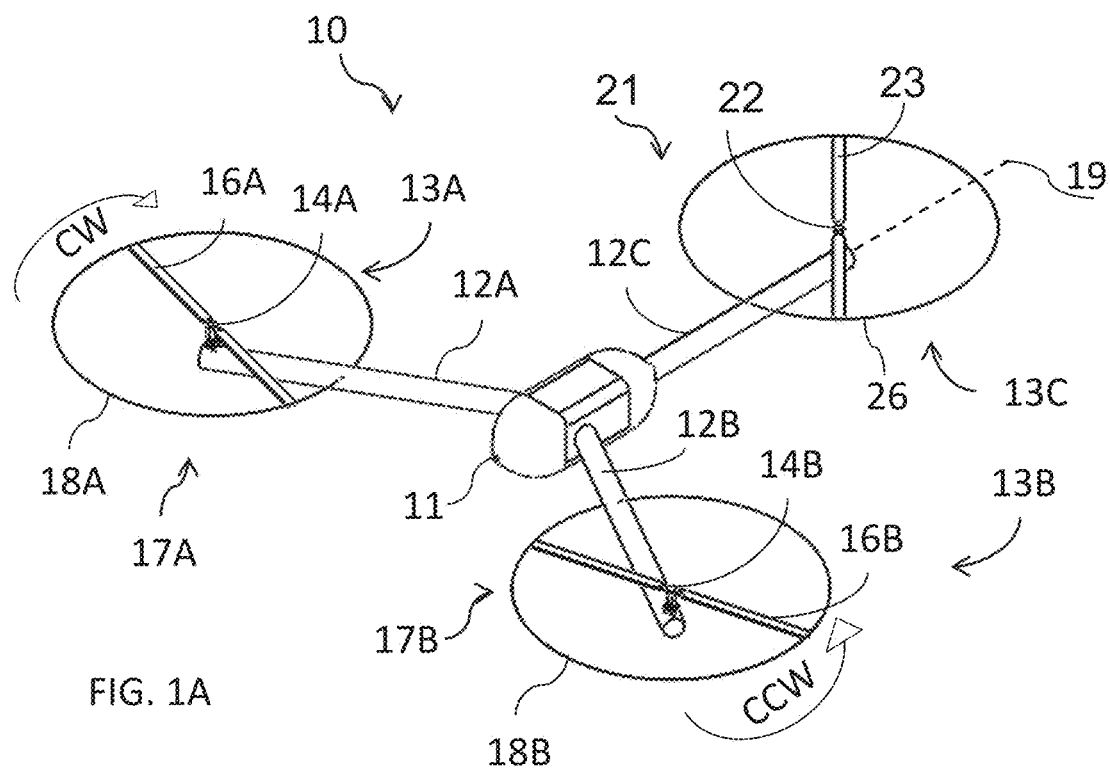
FIG. 1A is a schematic diagram showing a tricopter with a flight control system and a single rotor system arm with a floating mast.
Figure 1B:
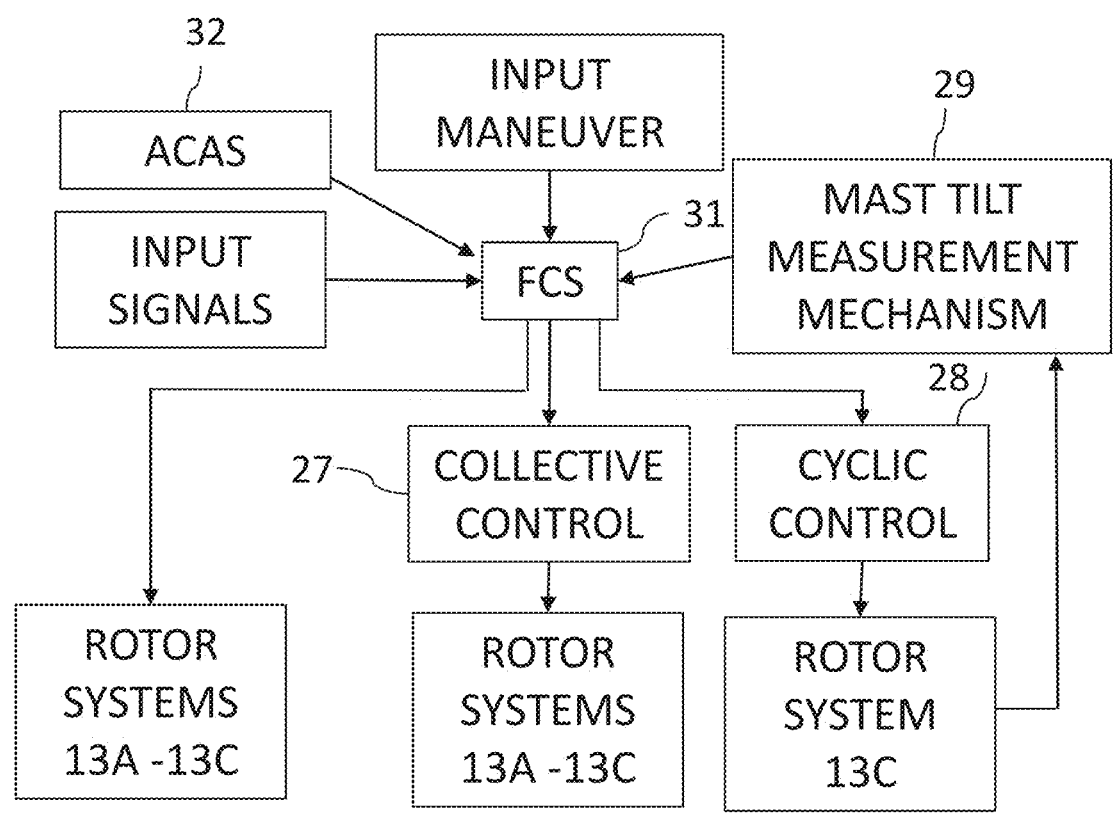
FIG. 1B is a block diagram of the flight control system.

FIG. 1A and FIG. 1B show a tricopter 10 including a fuselage 11 at an intersection of three preferably rigid rotor system arms 12A, 12B and 12C. The fuselage 11 can be designed for passengers and/or payload and can have different shapes and sizes. The rotor system arms 12A, 12B and 12C correspondingly include rotor systems 13A, 13B and 13C displaced from the fuselage 11. In small scale rotorcraft, control of the rotor systems 13A, 13B and 13C for adjusting rotorcraft inclination is typically by rpm only. In large scale rotorcraft, control of the rotor systems 13A, 13B and 13C for adjusting rotorcraft inclination is by rpm and/or collective rotor blade pitch.

The rotor systems 13A and 13B correspondingly have a fixedly mounted mast 14A and a fixedly mounted 14B mast each having an opposite pair of fixed pitch rotor blades 16A and 16B. The rotor systems 13A and 13B correspondingly have electric rotor motors 17A and 17B coupled to their masts 14A and 14B for driving same such that opposite pairs of fixed pitch rotor blades 16A and 16B act as rotor discs 18A and 18B graphically represented as circles. The rotor systems 13A and 13B are counter rotating thereby compensating each other torque at the same rpm, thereby having zero resultant torque.

Figure 6:
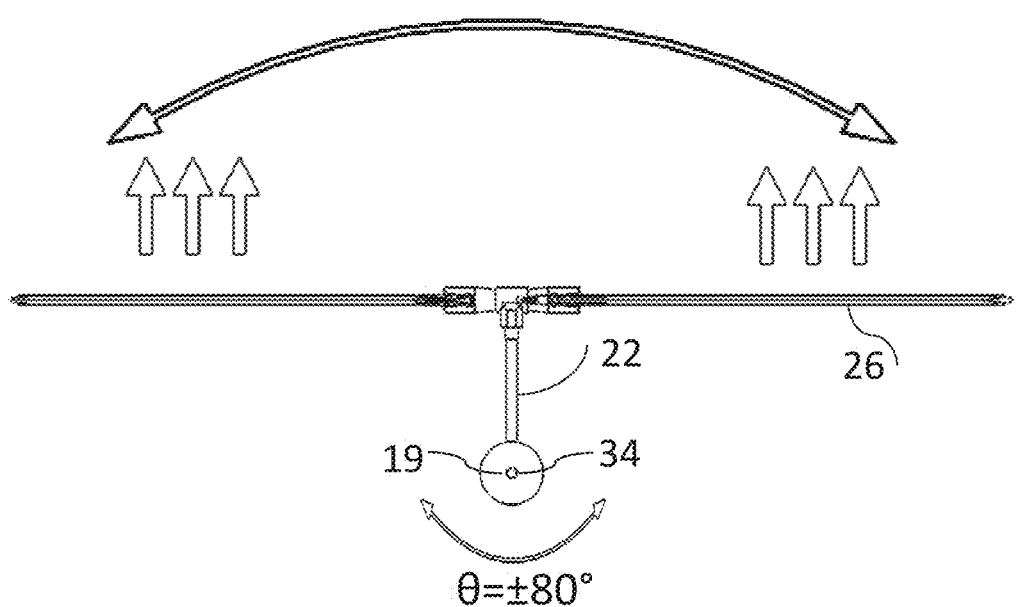
FIG. 6 is a right side elevation view of the FIG. 5 rotor system arm.

The rotor system arm 12C has a longitudinal rotor system arm centerline 19 and includes either a single axis or a dual axis support mechanism 21 for pivotally supporting a floating mast 22 having an opposite pair of rotor blades 23. The rotor system 13C includes an electric rotor motor 24 coupled to the floating mast 22 for driving same such that the opposite pair of rotor blades 23 act as a rotor disc 26 graphically represented as a circle. The electric rotor motor 24 can be directly coupled to the floating mast 22 whereby the electric rotor motor 24 tilts simultaneously with the floating mast 22. Alternatively, the electric rotor motor 24 can be stationary and coupled to the floating mast 22 by a linkage mechanism, thereby reducing the weight of the floating mast 22. The floating mast 22 has a tilt angle θ with respect to vertical where θ≤±80° as shown in FIG. 6. The single axis support mechanism 21A and the dual axis support mechanism 21B can provide mechanical stops for the floating mast 22.

The tricopter 10 is enabled with conventional collective control 27 of the collective rotor blade pitch of the three rotor systems 13A-13C and conventional cyclic control 28 of the cyclic rotor blade pitch of the rotor system 13C only. The rotor systems 13A-13C have individually controllable collective rotor blade pitch. The rotor system 13C preferably includes a servo-controlled swashplate mechanism for enabling individual or simultaneous adjustment of its collective rotor blade pitch and cyclic rotor blade pitch. The rotor system 13C can include alternative mechanisms for enabling individual or simultaneous adjustment of its collective rotor blade pitch and cyclic rotor blade pitch.

The tricopter 10 includes a mast tilt measurement mechanism 29 for measuring a tilt of the floating mast 22 relative to a fiducial tilt position. Suitable commercially available gravitational accelerometers for measuring a floating mast's tilt include inter alia a FXOS8700CQ accelerometer commercially available from NXP Semiconductors N.V.

The tricopter 10 includes a Flight Control System (FCS) 31 for receiving a multitude of input signals regarding attitude of the tricopter, flight conditions, and the like. The FCS 31 also receives a desired input maneuver for the tricopter and a mast tilt feedback signal from the mast tilt measurement mechanism 29 regarding the floating mast 22's tilt position relative to its fiducial tilt position. The FCS 31 outputs control signals for continuously controlling the rotor systems 13A-13C for executing the desired input maneuver and compensate for instantaneous changes.

The FCS 31 is a computing device including at least one processing unit and optionally a memory. The presently disclosed subject matter, or certain aspects or portions thereof, may take the form of program code embodied in computer readable storage medium for loading into a computing device whereupon the computing device becomes the FCS 31.

The FCS 31 continuously controls the floating mast 22 in response to the mast tilt feedback signal for executing the following steps: At an initial tilt position of the floating mast 22, the FCS 31 actuates minor cyclic rotor blade pitch adjustments to maintain the floating mast 22 thereat. Second, the FCS 31 actuates a major cyclic rotor blade pitch adjustment for tilting the floating mast 22 from its initial tilt position to a desired tilt position. And thirdly, upon arrival at the desired tilt position, the FCS 31 neutralizes the major cyclic rotor blade pitch adjustment and reverts to actuating minor cyclic rotor blade pitch adjustments to maintain the floating mast 22 at its desired tilt position. A major cyclic rotor blade pitch adjustment to achieve a desired tilt position is typically in the order of milliseconds. The tilt angle between an initial tilt position and a desired tilt position is typically in the order of about 45°.

The tricopter 10 can include an Advanced Collision Avoidance System (ACAS) 32 for assisting indoor and outdoor flight applications. The ACAS 32 includes inter alia sonar sensors, IR sensors, LIDAR sensors, and the like. The ACAS 32 is also employable for avoiding ground collisions. The ACAS 32 is commercially available from FlytBase, Inc, www.flytbase.com and similar vendors.

Figure 2A:
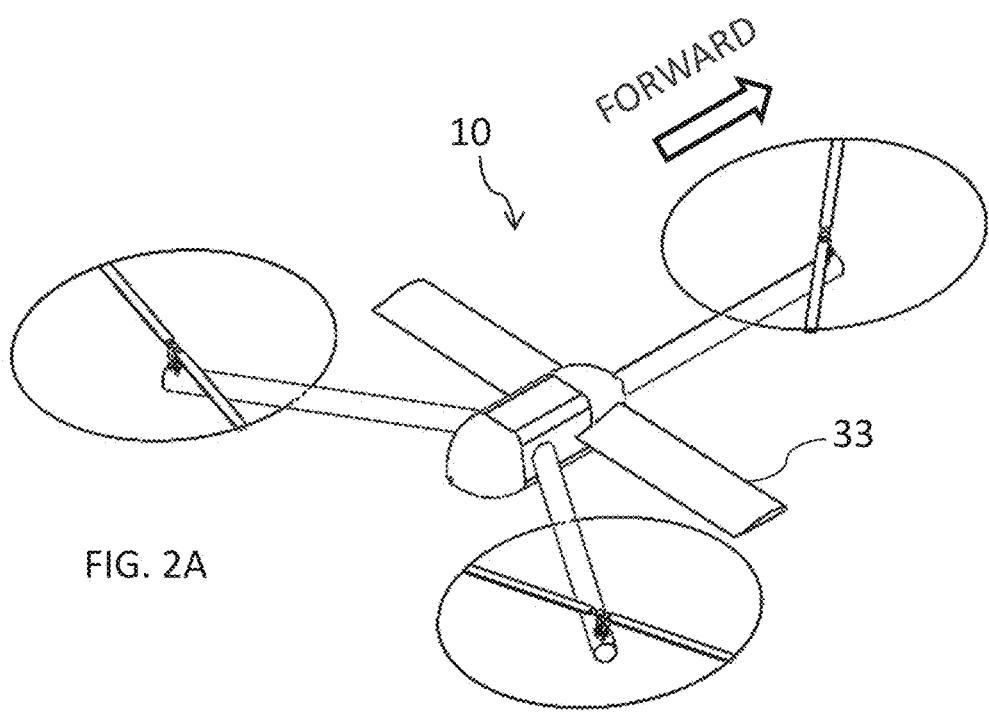
FIG. 2A is a schematic diagram of the FIG. 1A tricopter with wings.

FIG. 2A shows the tricopter 10 with a pair of aerodynamic wings 33.

Figure 2B:
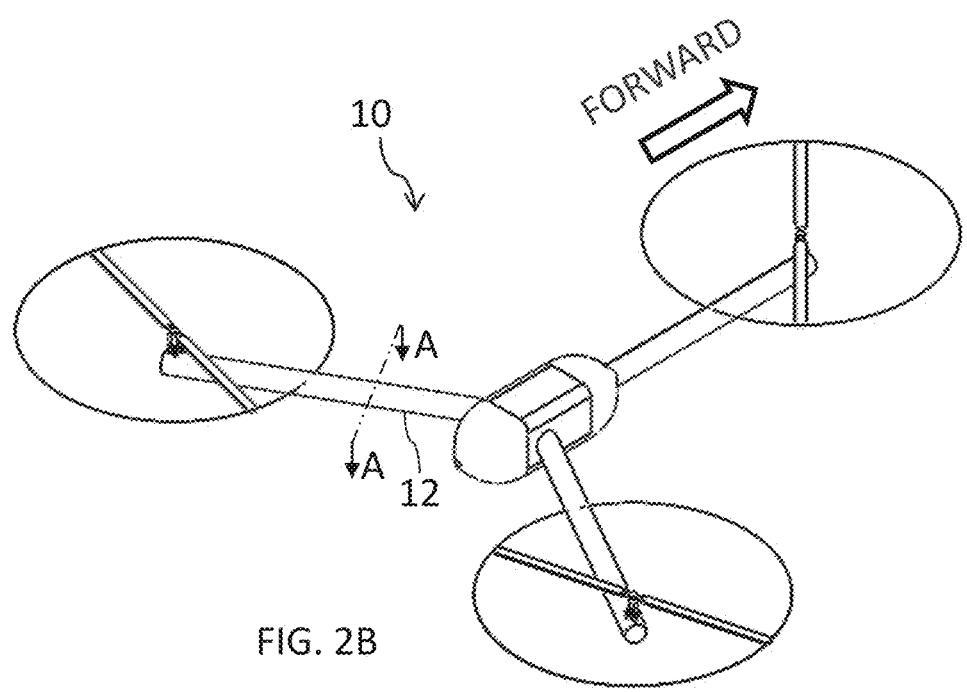
FIG. 2B is a schematic diagram of the FIG. 1A tricopter with rotor system arms configured as aerodynamic wings for providing lift.
Figure 2C:
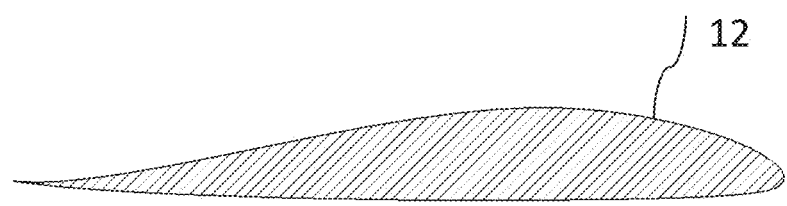
FIG. 2C is a transverse cross section of an aerodynamic lifting rotor system arm along line A-A in FIG. 2B.

FIG. 2B and FIG. 2C show the tricopter 10 with rotor system arms 12 configured as aerodynamic wings for providing lift.

Figure 3:
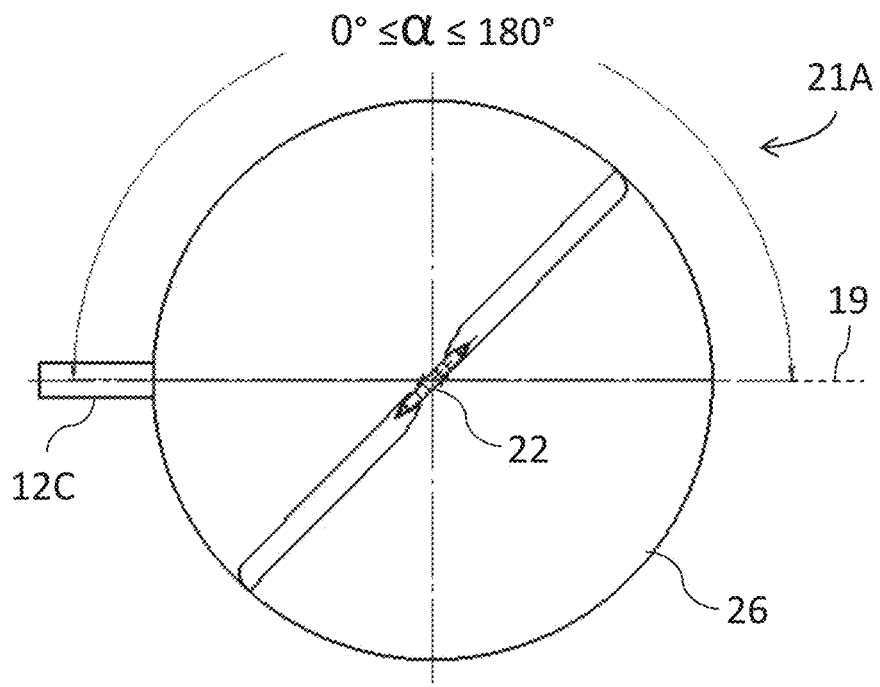
FIG. 3 is a top plan view of a rotor system arm with a single axis support mechanism pivotally supporting a floating mast at a fixed angle α where $0° \leq \alpha \leq 180°$ relative to the rotor system arm.

FIG. 3 shows a single axis support mechanism 21A pivotally supporting the floating mast 22 along a single pre-determined straight tilt line which subtends an included fixed angle α where 0°≤α≤180° relative to the longitudinal rotor system arm centerline 19 in a top plan view of the rotary system arm 12C. The single axis support mechanism 21A is preferably designed to pivotally support a floating mast 22 either co-directional with the rotor system arm 12C in the top plan view or perpendicular to the rotor system arm 12C in the top plan view.

Figure 4:
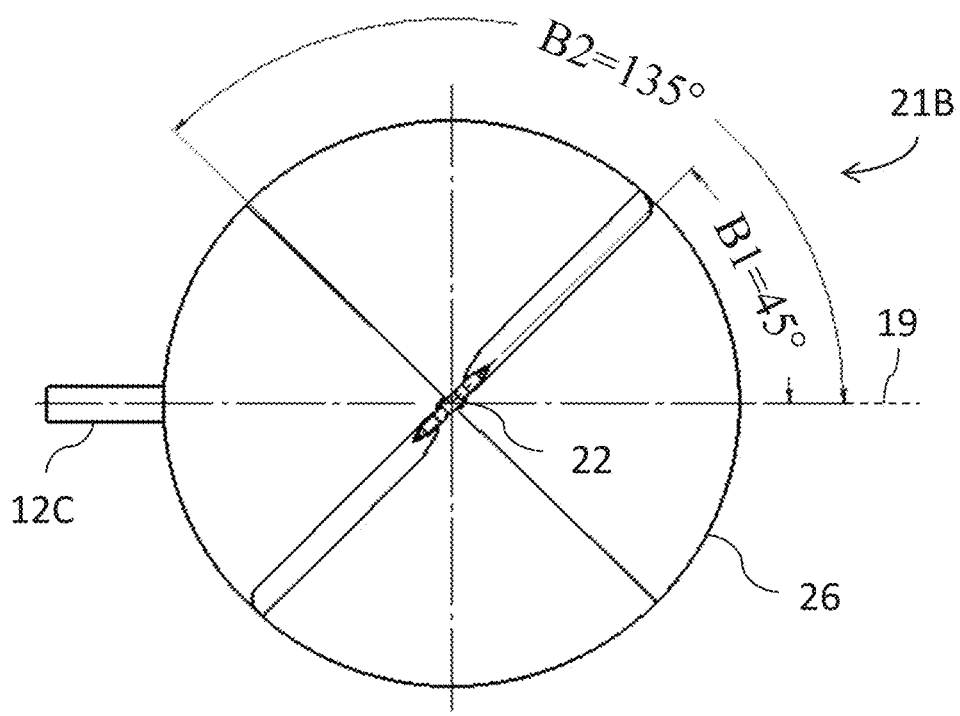
FIG. 4 is a top plan view of a rotor system arm with a dual axis support mechanism pivotally supporting a floating mast at two exemplary angles $\beta 1=45°$ and $\beta 2=135°$ relative to the rotor system arm.

FIG. 4 shows a dual axis support mechanism 21B pivotally supporting the floating mast 22 along two pre-determined straight tilt lines which can each subtend an included angle β where 0°≤β≤180° relative to the longitudinal rotor system arm centerline 19 in a top plan view of the rotary system arm 12C. The two tilt lines are preferably orthogonal for facilitating control of a floating mast 22. FIG. 4 shows two exemplary straight tilt lines β1=45° and β2=135° relative to the longitudinal rotor system arm centerline 19.

Figure 5:
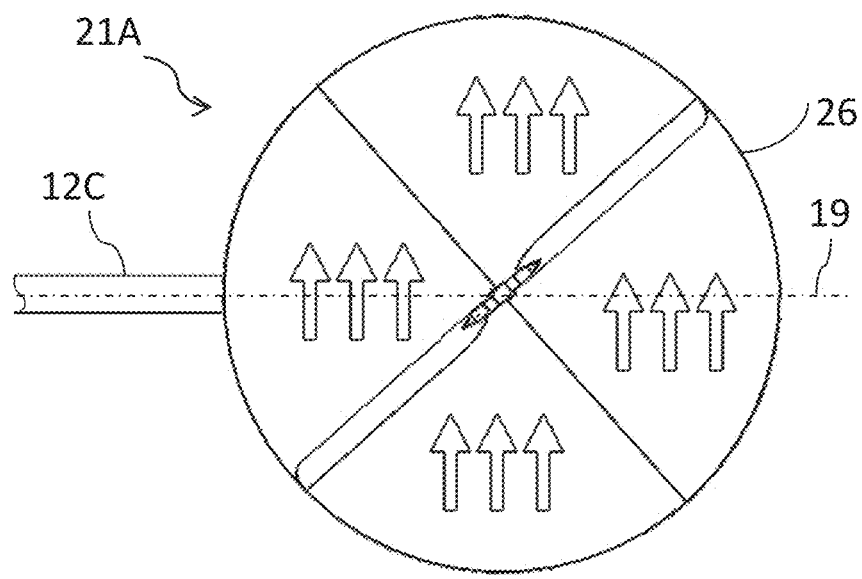
FIG. 5 is a top plan view of a rotor system arm with a single axis support mechanism for pivotally supporting a floating mast tiltable about a longitudinal rotor system arm centerline in a right side elevation view thereof and deployed at an initial tilt position.
Figure 7:
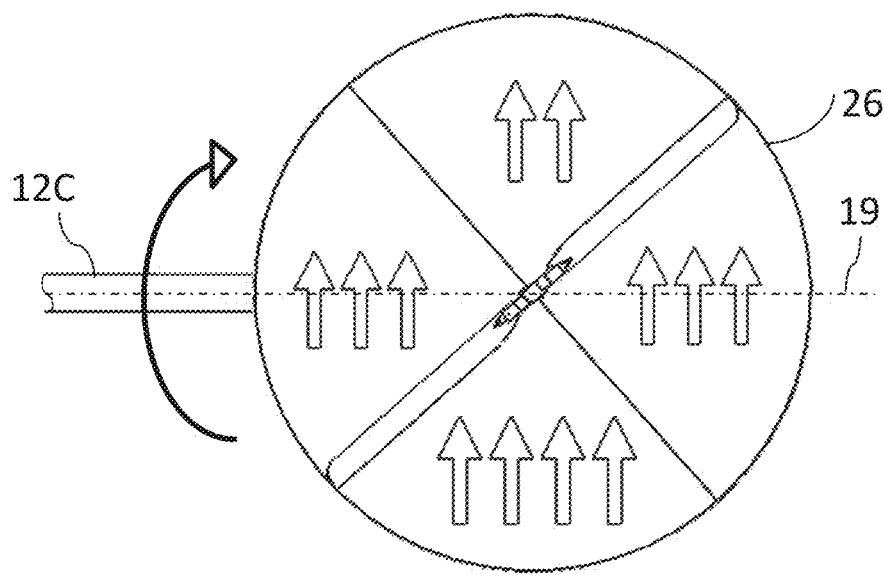
FIG. 7 is a top plan view of the FIG. 5 rotor system arm showing a transitory application of cyclic rotor blade pitch to tilt the floating mast from the initial tilt position to a desired tilt position.
Figure 8:
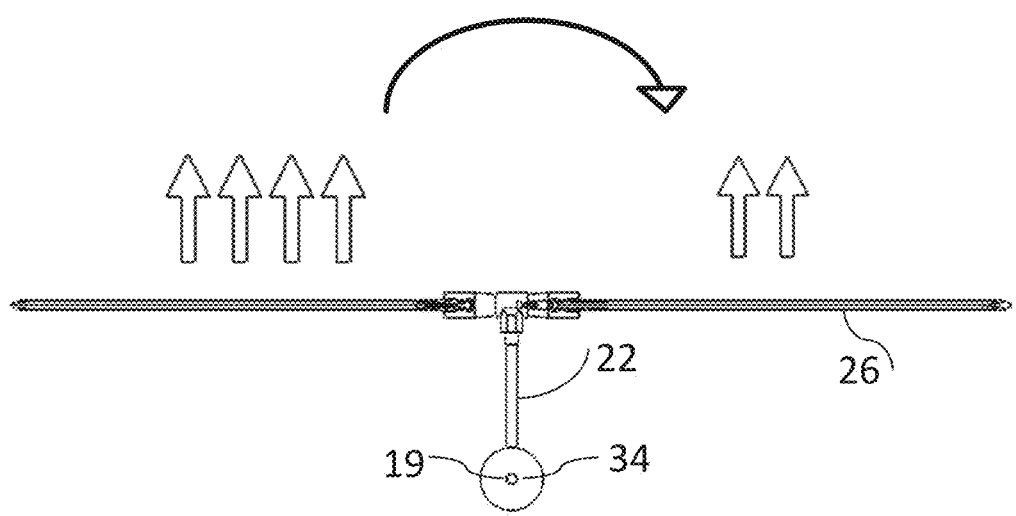
FIG. 8 is a right side elevation view of the FIG. 7 rotor system arm.
Figure 9:
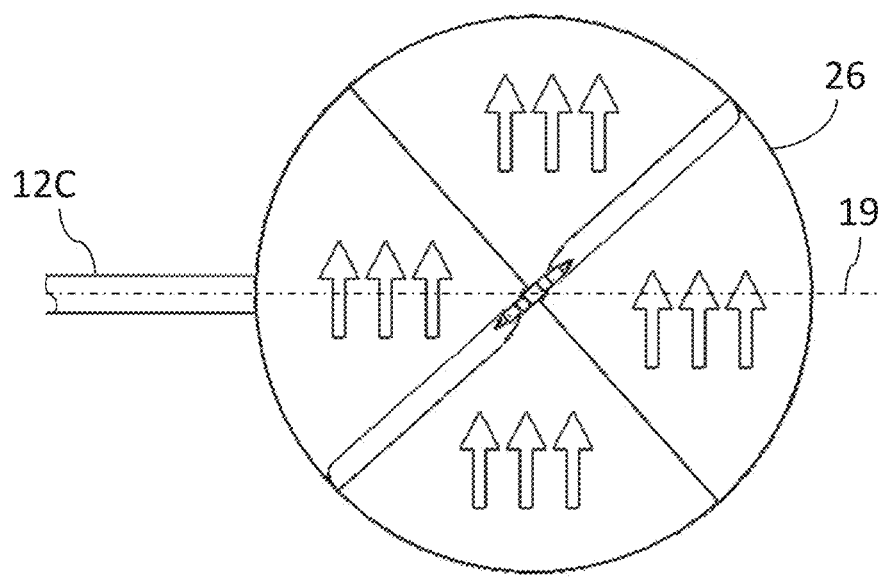
FIG. 9 is a top plan view of the FIG. 5 rotor system arm showing the floating mast at the desired tilt position.
Figure 10:
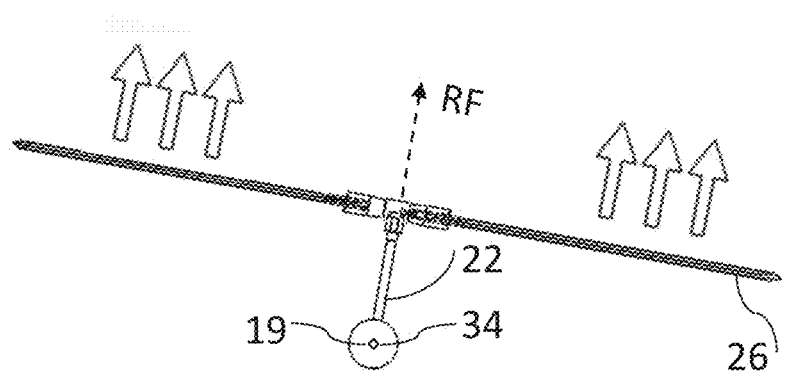
FIG. 10 is a right side elevation view of the FIG. 9 rotor system arm.

FIG. 5 to FIG. 10 show a single axis support mechanism 21A pivotally supporting the floating mast 22 about a pivot axis 34 co-axial with the longitudinal rotor system arm centerline 19. FIG. 5, FIG. 7 and FIG. 9 show lift-thrust forces on four quadrants of the rotor disc 26 in the top plan view. FIG. 6, FIG. 8 and FIG. 10 show lift-thrust forces on the two quadrants of the rotor disc 26 on opposite sides of the floating mast 22 in the right side elevation view. FIG. 10 shows the rotor disc 26 applies a resultant force RF on the rotor system arm 12C in the floating mast 22's general direction. The resultant force RF has a vertical lift component and a horizontal thrust component for steering and/or maneuvering purposes.

FIG. 5 and FIG. 6 show the floating mast 22 in an initial tilt position. Cyclic rotor blade control is continuously employed for causing minor cyclic rotor blade pitch adjustments to maintain the floating mast 22 thereat to compensate for instantaneous changes. FIG. 7 and FIG. 8 show a transitory major cyclic rotor blade pitch adjustment to tilt the floating mast 22 from the initial tilt position to a desired tilt position. Such transitory major cyclic rotor blade pitch adjustments typically last a short duration of few milliseconds. The desired tilt position is typically within ±30° with respect to the vertical. FIG. 9 and FIG. 10 show neutralization of the major cyclic rotor blade pitch adjustment at the floating mast 22's desired tilt position. Cyclic rotor blade control is again continuously employed for causing minor cyclic rotor blade pitch adjustments to maintain the floating mast 22 thereat to compensate for instantaneous changes.

Figure 11:
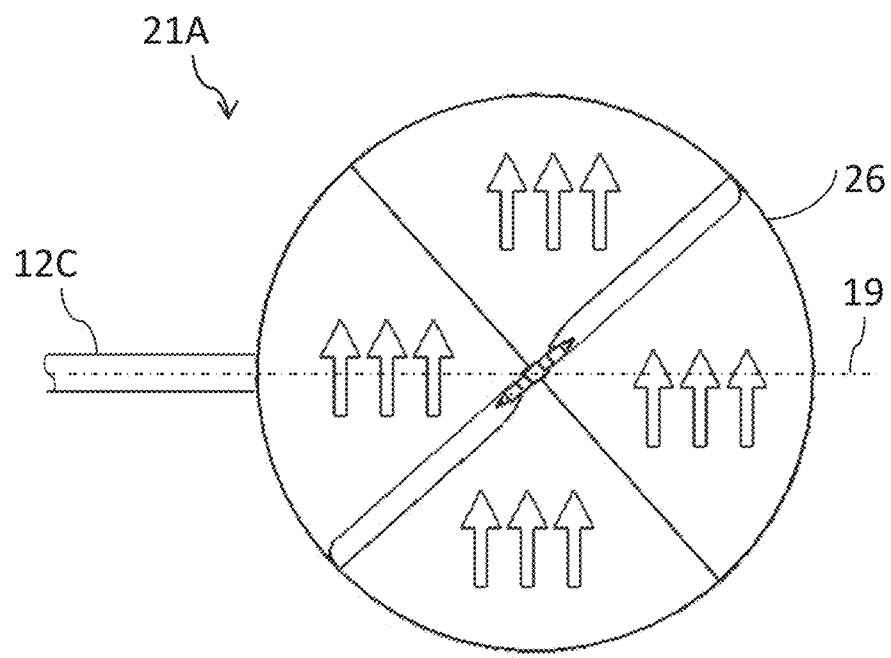
FIG. 11 is a top plan view of a rotor system arm with a single axis support mechanism for pivotally supporting a floating mast tiltable along a longitudinal rotor system arm centerline in a front elevation view thereof and deployed at an initial tilt position.
Figure 12:
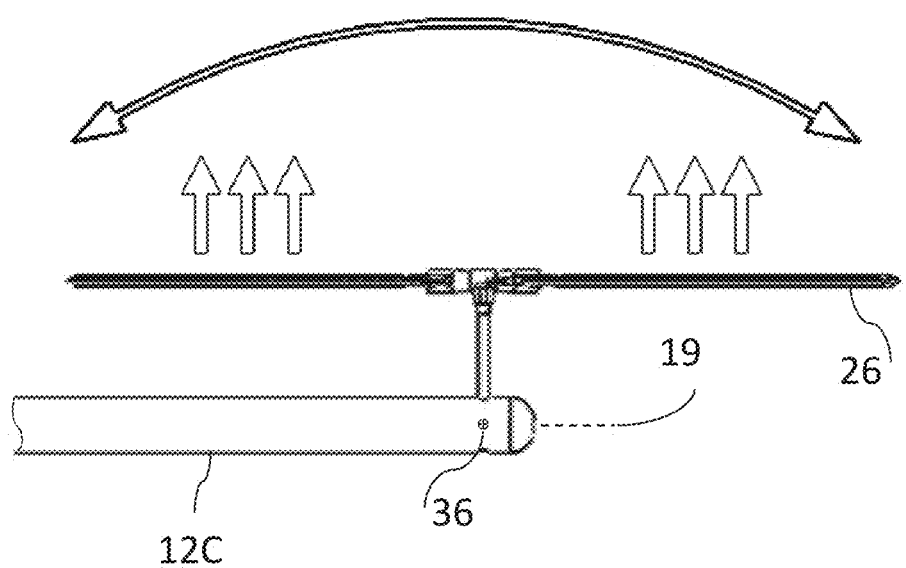
FIG. 12 is a front elevation view of the FIG. 11 rotor system arm.
Figure 13:
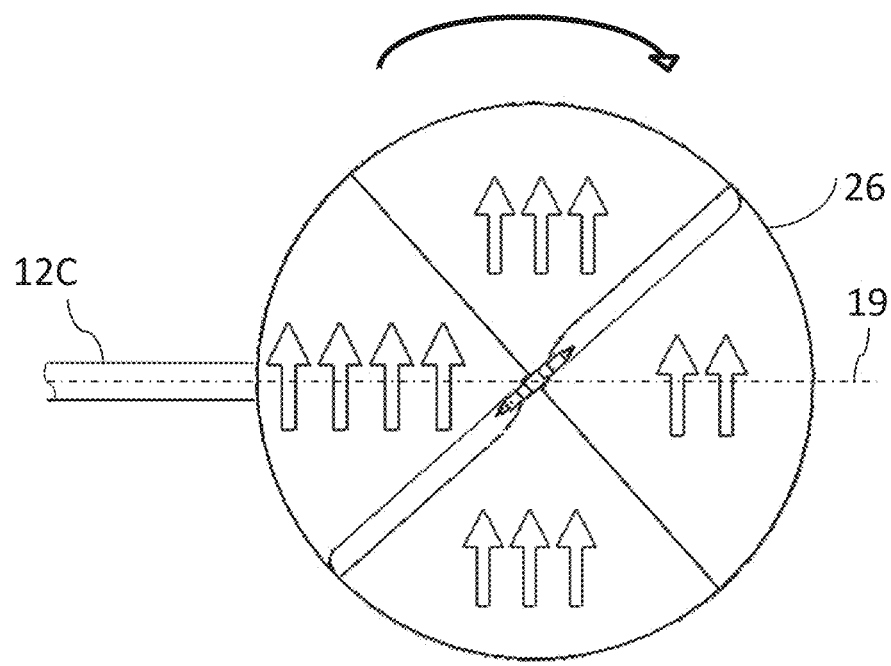
FIG. 13 is a top plan view of the FIG. 11 rotor system arm showing a transitory application of cyclic rotor blade pitch to tilt the floating mast from the initial tilt position to a desired tilt position.
Figure 14:
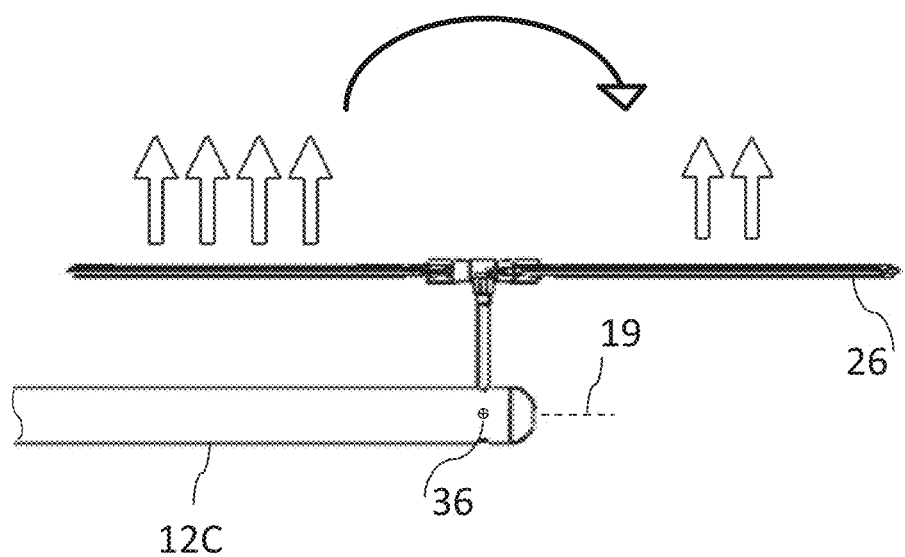
FIG. 14 is a front elevation view of the FIG. 13 rotor system arm.
Figure 15:
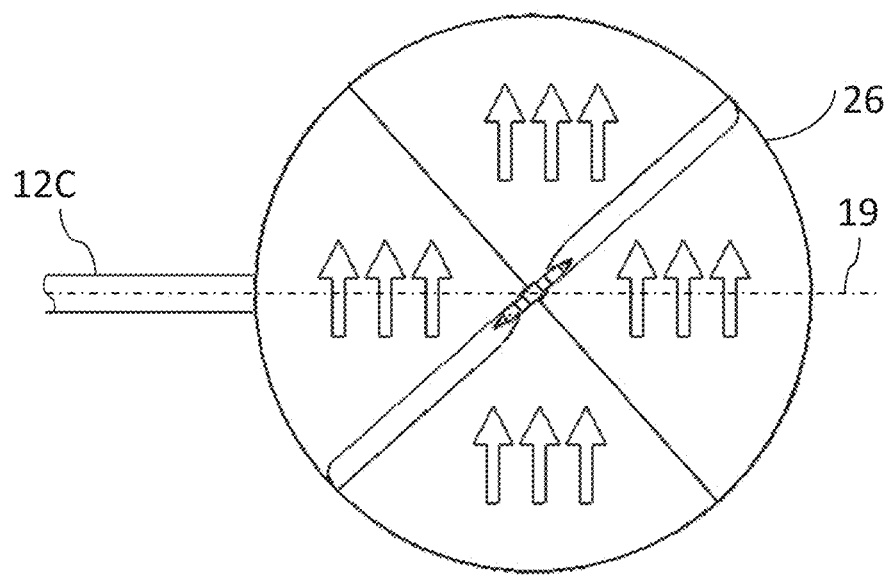
FIG. 15 is a top plan view of the FIG. 11 rotor system arm showing the floating mast at the desired tilt position.
Figure 16:
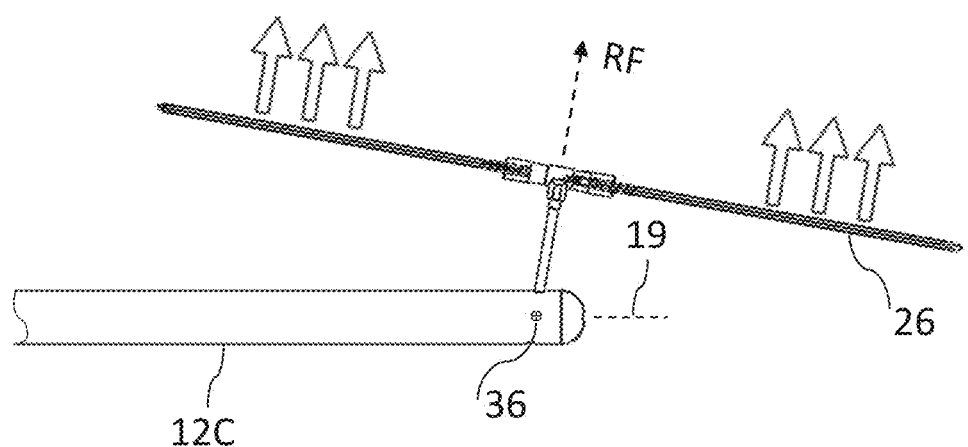
FIG. 16 is a front elevation view of the FIG. 15 rotor system arm.

FIG. 11 to FIG. 16 show a single axis support mechanism 21A pivotally supporting the floating mast 22 about a pivot axis 36 perpendicular to the longitudinal rotor system arm centerline 19 in a front elevation view thereof. FIG. 11, FIG. 13 and FIG. 15 show lift-thrust forces on four quadrants of the rotor disc 26. FIG. 12, FIG. 14 and FIG. 16 show lift-thrust forces on the two quadrants of the rotor disc 26 on opposite sides of the floating mast 22 in the front elevation view. FIG. 16 shows the rotor disc 26 applies a resultant force RF on the rotor system arm 12C in the floating mast 22's general direction. The resultant force RF has a vertical lift component and a horizontal thrust component for steering and/or maneuvering purposes.

FIG. 11 and FIG. 12 show the floating mast 22 in an initial tilt position. Cyclic rotor blade control is continuously employed for causing minor cyclic rotor blade pitch adjustments to maintain the floating mast 22 thereat to compensate for instantaneous changes. FIG. 13 and FIG. 14 show a transitory major cyclic rotor blade pitch adjustment to tilt the floating mast 22 from the initial tilt position to a desired tilt position. Such transitory major cyclic rotor blade pitch adjustments typically last a short duration of few milliseconds. The desired tilt position is typically within ±30° with respect to the vertical. FIG. 15 and FIG. 16 show neutralization of the major cyclic rotor blade pitch adjustment at the floating mast 22's desired tilt position. Cyclic rotor blade control is again continuously employed for causing minor cyclic rotor blade pitch adjustments to maintain the floating mast 22 thereat to compensate for instantaneous changes.

Figure 17:
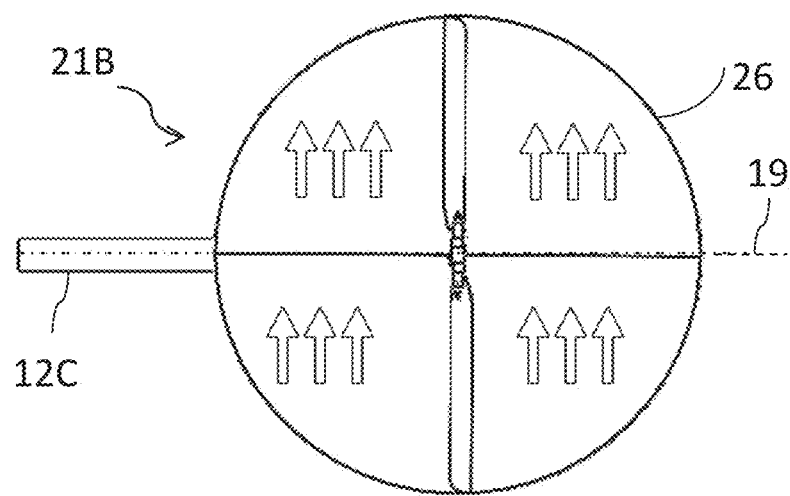
FIG. 17 is a top plan view of a rotor system arm with a dual axis support mechanism for pivotally supporting a floating mast deployed in an initial tilt position.
Figure 18A:
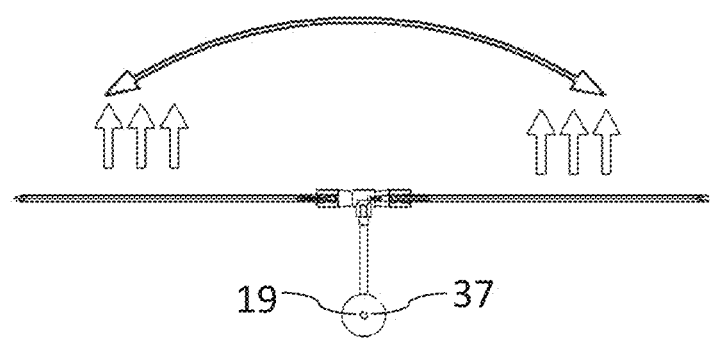
FIG. 18A is a right side elevation view of the FIG. 17 rotor system arm.
Figure 18B:
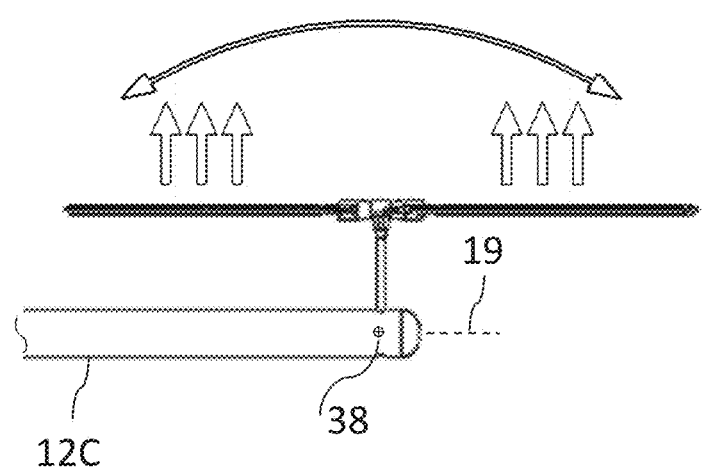
FIG. 18B is a front elevation view of the FIG. 17 rotor system arm.
Figure 19:
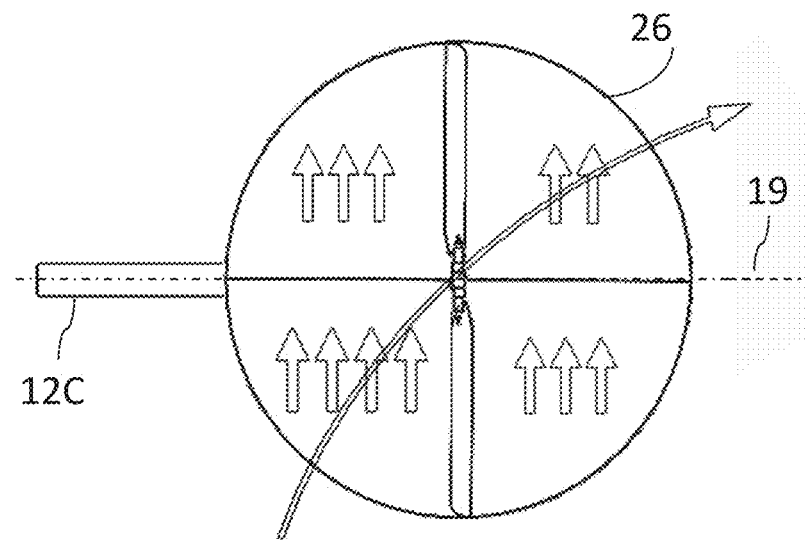
FIG. 19 is a top plan view of the FIG. 17 rotor system arm showing a transitory application of cyclic rotor blade pitch to tilt the floating mast from the initial tilt position to a desired tilt position.
Figure 20A:
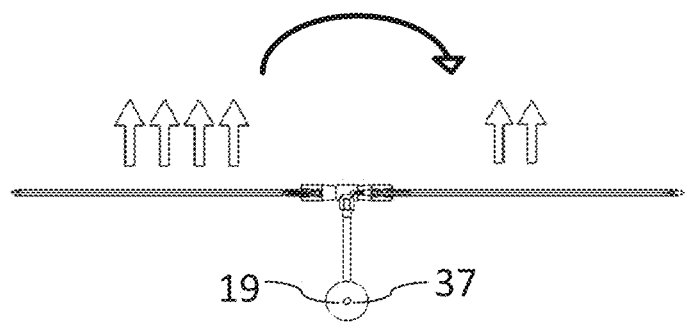
FIG. 20A is a right side elevation view of the FIG. 19 rotor system arm.
Figure 20B:
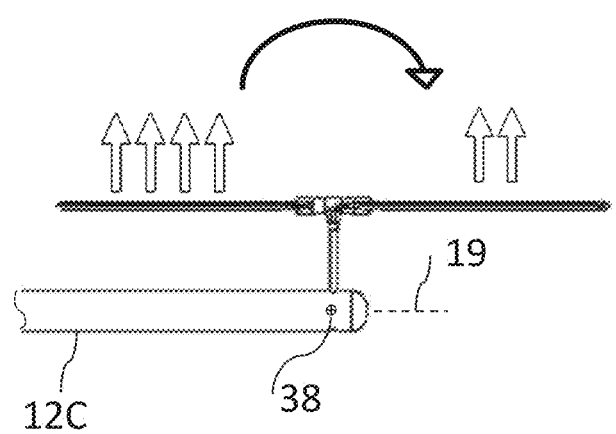
FIG. 20B is a front elevation view of the FIG. 19 rotor system arm.
Figure 21:
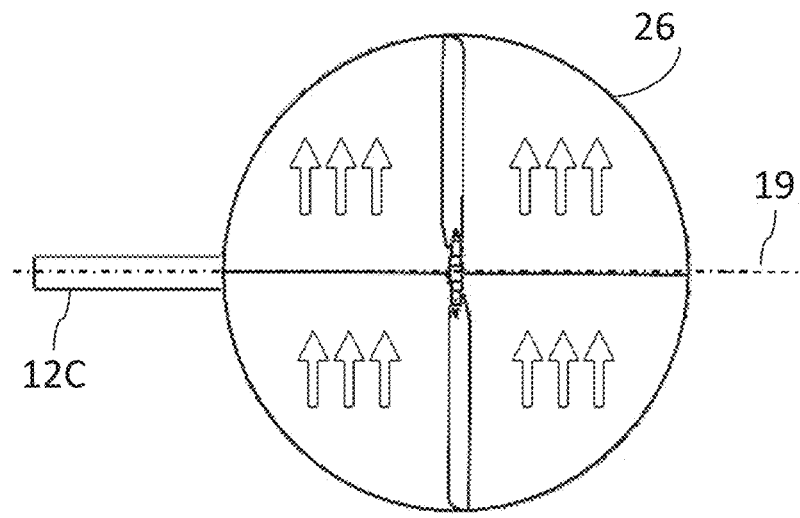
FIG. 21 is a top plan view of the FIG. 17 rotor system arm showing the floating mast at the desired tilt position.

FIG. 17 to FIG. 22 show a dual axis support mechanism 21B pivotally supporting the floating mast 22 about orthogonal pivot axes 37 and 38 correspondingly co-axial with the longitudinal rotor system arm centerline 19 and perpendicular thereto such that the floating mast 22 tilts at both about the rotor system arm 12C in a right side elevation view thereof and co-directional with the rotor system arm 12C in a front elevation view thereof. FIG. 17, FIG. 19 and FIG. 21 show the lift-thrust forces on four quadrants of the rotor disc 26. FIG. 19 shows an arrow depicting the combined movement of the floating mast 22. FIG. 18A, FIG. 20A and FIG. 22A show lift-thrust forces on the two quadrants of the rotor disc 26 on opposite sides of the floating mast 22 in the right side elevation view. FIG. 18B, FIG. 20B and FIG. 22B show lift-thrust forces on the two quadrants of the rotor disc 26 on opposite sides of the floating mast 22 in the front elevation view. FIG. 22A and FIG. 22B show the rotor disc 26 applies a resultant force RF on the rotor system arm 12C in the floating mast 22's general direction. The resultant force RF has a vertical lift component and a horizontal thrust component for steering and/or maneuvering purposes.

Figure 22A:
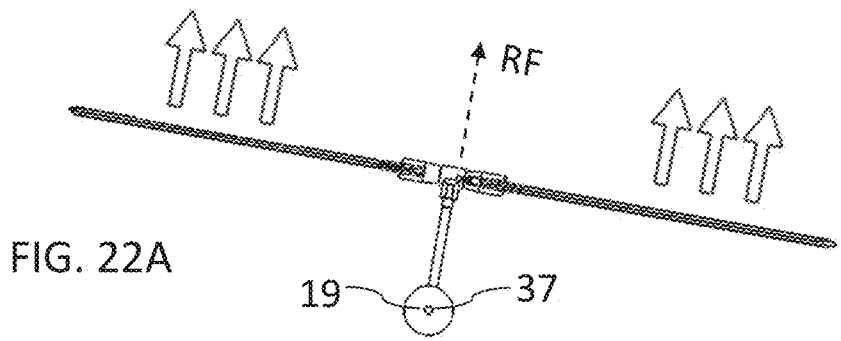
FIG. 22A is a right side elevation view of the FIG. 21 rotor system arm.
Figure 22B:
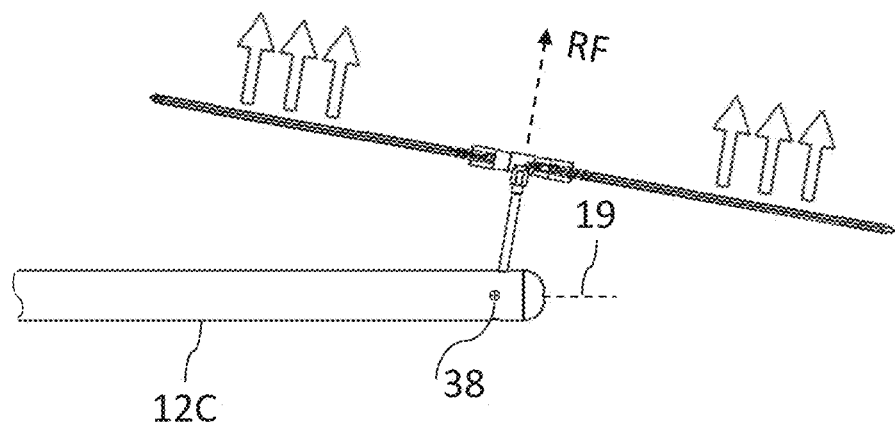
FIG. 22B is a front elevation view of the FIG. 21 rotor system arm.

FIG. 17, FIG. 18A and FIG. 18B show the floating mast 22 in an initial tilt position. Cyclic rotor blade control is continuously employed for causing minor cyclic rotor blade pitch adjustments to maintain the floating mast 22 thereat to compensate for instantaneous changes. FIG. 19, FIG. 20A and FIG. 20B show a transitory major cyclic rotor blade pitch adjustment to tilt the floating mast 22 from the initial tilt position to a desired tilt position. Such transitory major cyclic rotor blade pitch adjustments typically last a short duration of few milliseconds. The desired tilt position is typically within ±30° with respect to the vertical. FIG. 21, FIG. 22A and FIG. 22B show neutralization of the major cyclic rotor blade pitch adjustment at the floating mast 22's desired tilt position. Cyclic rotor blade control is again continuously employed for causing minor cyclic rotor blade pitch adjustments to maintain the floating mast 22 thereat to compensate for instantaneous changes.

Section 2: Single Axis and Dual Axis Support Mechanisms for Pivotally Supporting Floating Masts Single axis support mechanisms for pivotally supporting a floating mast can be implemented by single bearings, pairs of opposite and parallel bearings, single rails, pairs of opposite and parallel rails, and the like. Dual axis support mechanisms for pivotally supporting a floating mast can be implemented by bearings, rails, and the like. Selection of an implementation of a support mechanism depends on a number of factors including inter alia size and weight of a rotorcraft, desired maximum degree of tilting, pivot axis and the like.

Figure 23:
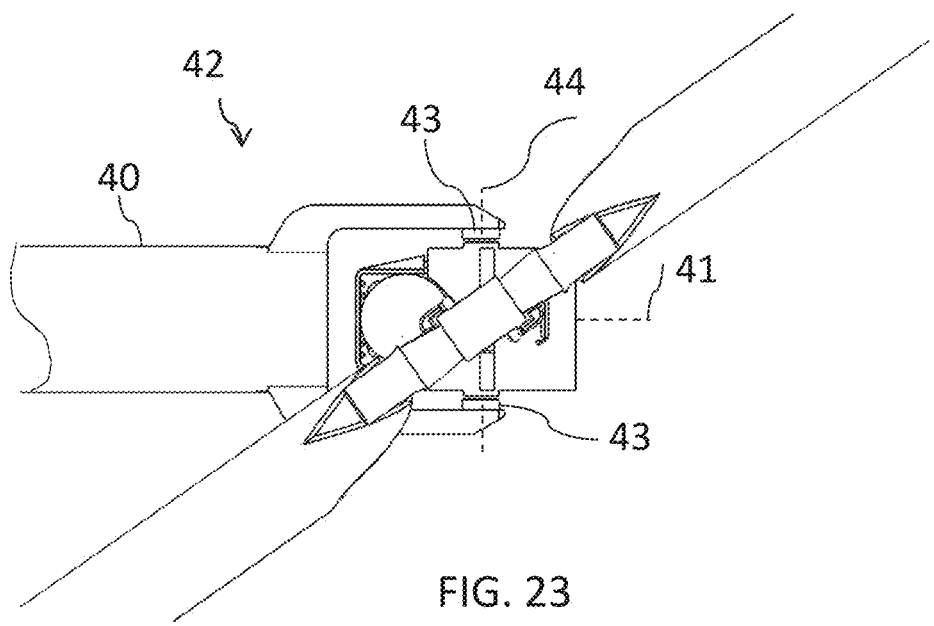
FIG. 23 is a top plan view of a rotor system arm with a single axis support mechanism with a pair of opposite and parallel bearings for pivotally supporting a floating mast.
Figure 24:
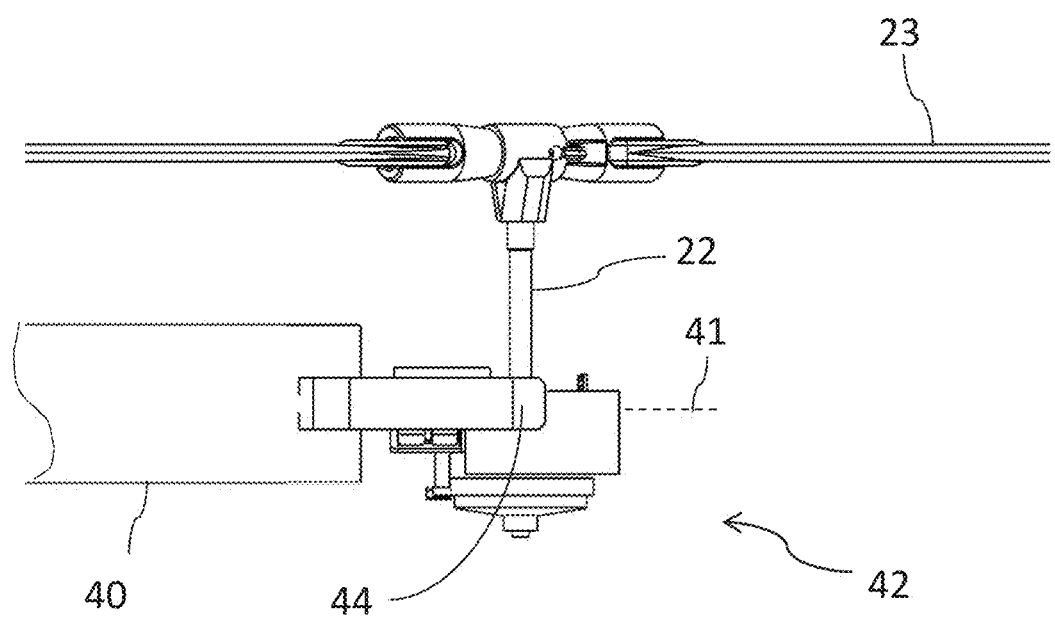
FIG. 24 is a front elevation view of the FIG. 23 rotor system arm.

FIG. 23 and FIG. 24 show a rotor system arm 40 with a longitudinal rotor system arm centerline 41 and having a single axis support mechanism 42 with a pair of opposite and parallel bearings 43 on either side of the longitudinal rotor system arm centerline 41 for providing a pivot axis 44 perpendicular thereto and intercepting same. The pivot axis 44 is necessarily beneath a juncture between the floating mast 22 and opposite pair of rotor blades 23.

Figure 25:
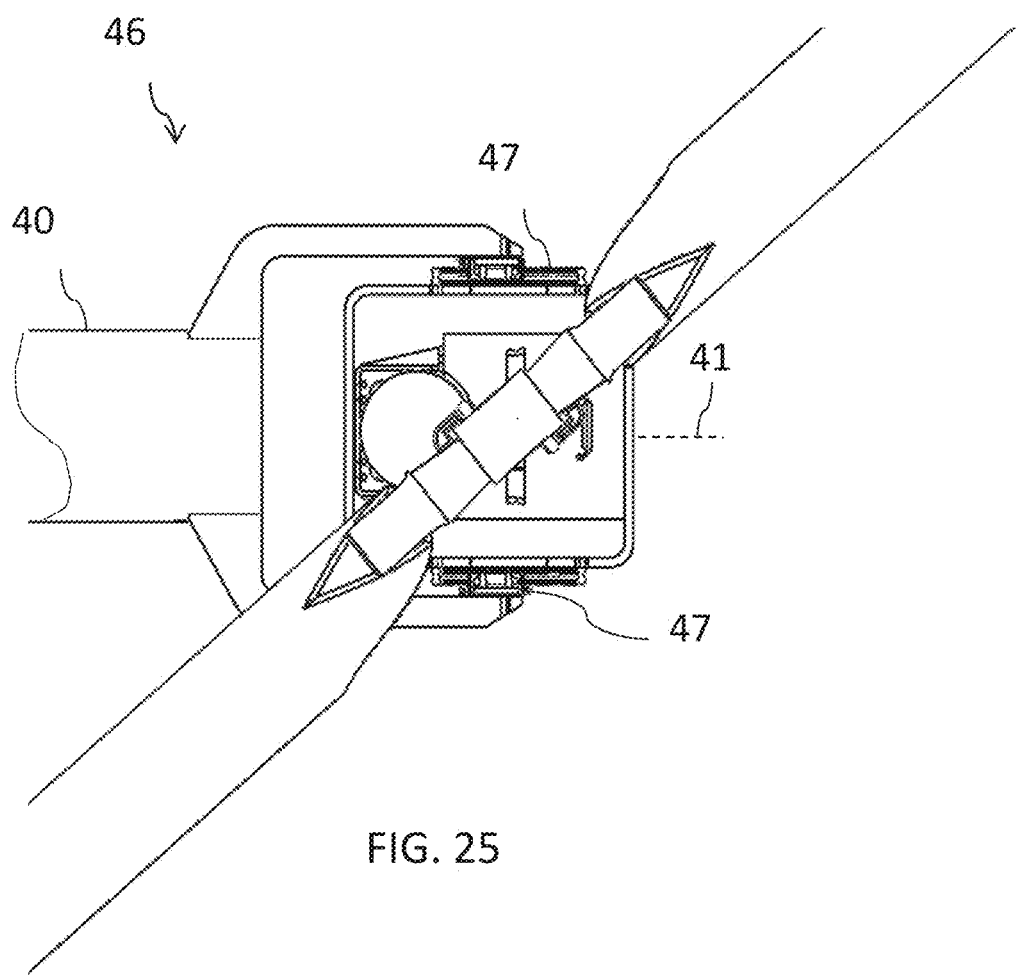
FIG. 25 is a top plan view of a rotor system arm with a single axis support mechanism with a pair of opposite and parallel rails for pivotally supporting a floating mast.
Figure 26:
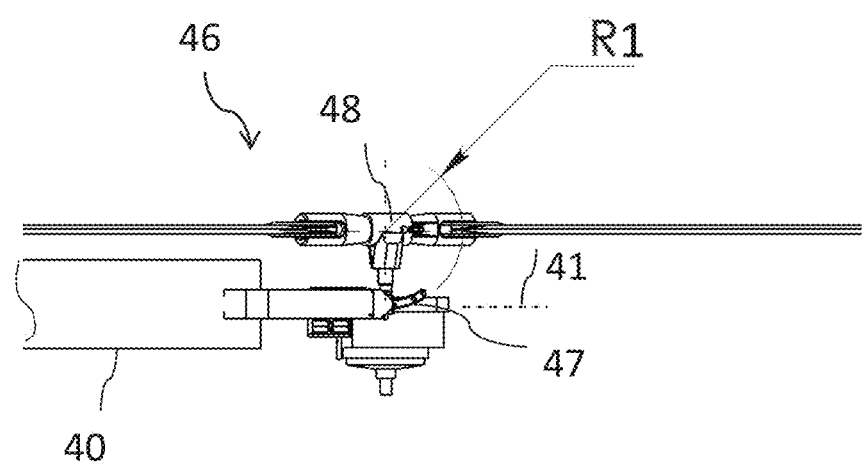
FIG. 26 is a front elevation view of the FIG. 25 rotor system arm.
Figure 27:
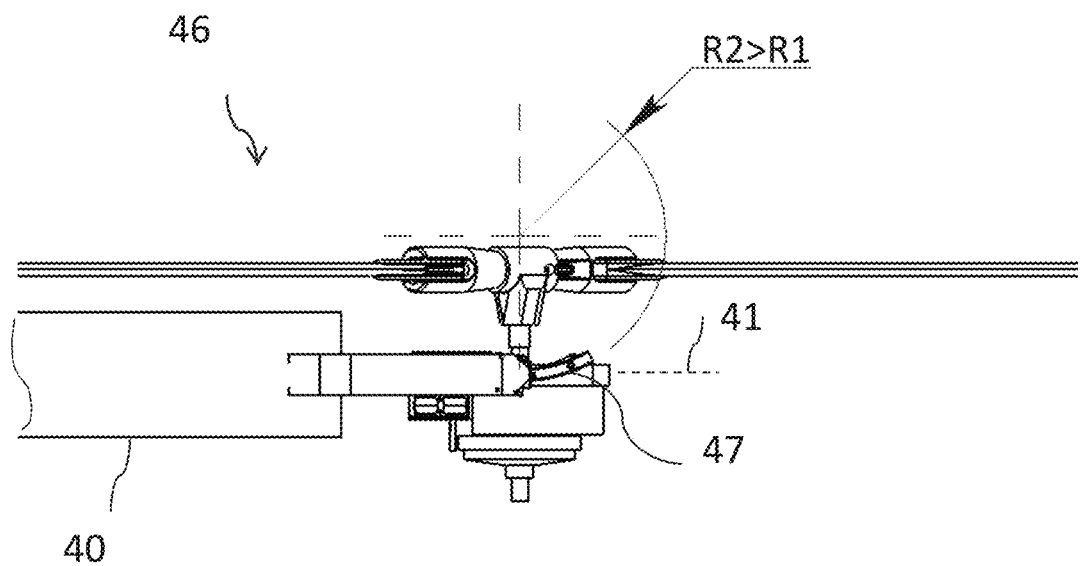
FIG. 27 is a front elevation view of the FIG. 25 rotor system arm with alternative pair of opposite and parallel rails for pivotally supporting a floating mast.

FIG. 25 and FIG. 26 show the rotor system arm 40 having a single axis support mechanism 46 with a pair of opposite and parallel curved rails 47 deployed on both sides of the longitudinal rotor system arm centerline 41. The pair of opposite and parallel curved rails 47 are preferably deployed symmetrical with respect to the vertical. The single axis support mechanism 46 can be readily designed to provide a pivot axis 48 adjacent the juncture between the floating mast 22 and the opposite pair of rotor blades 23, thereby affording a more stable arrangement than the single axis support mechanism 42. The single axis support mechanism 46 can be readily designed to control the location of the pivot axis 48 relative to the rotor system arm 40. FIG. 25 and FIG. 26 show the single axis support mechanism 46 has a pair of opposite and parallel curved rails 47 with a radius of curvature R1 such that the pivot axis 48 is at the juncture between the floating mast 22 and the opposite pair of rotor blades 23. FIG. 27 shows the single axis support mechanism 46 has a pair of opposite and parallel curved rails 47 with a radius of curvature R2 greater than the radius of curvature R1 thereby elevating the pivot axis 48 above the juncture between the floating mast 22 and the opposite pair of rotor blades 23.

The single axis support mechanisms 42 and 46 can equally be used for providing a pivot axis codirectional with the rotor system arm 40 whereby a floating mast 22 tilts about the rotor system arm 40 in a right side elevation view.

Figure 28:
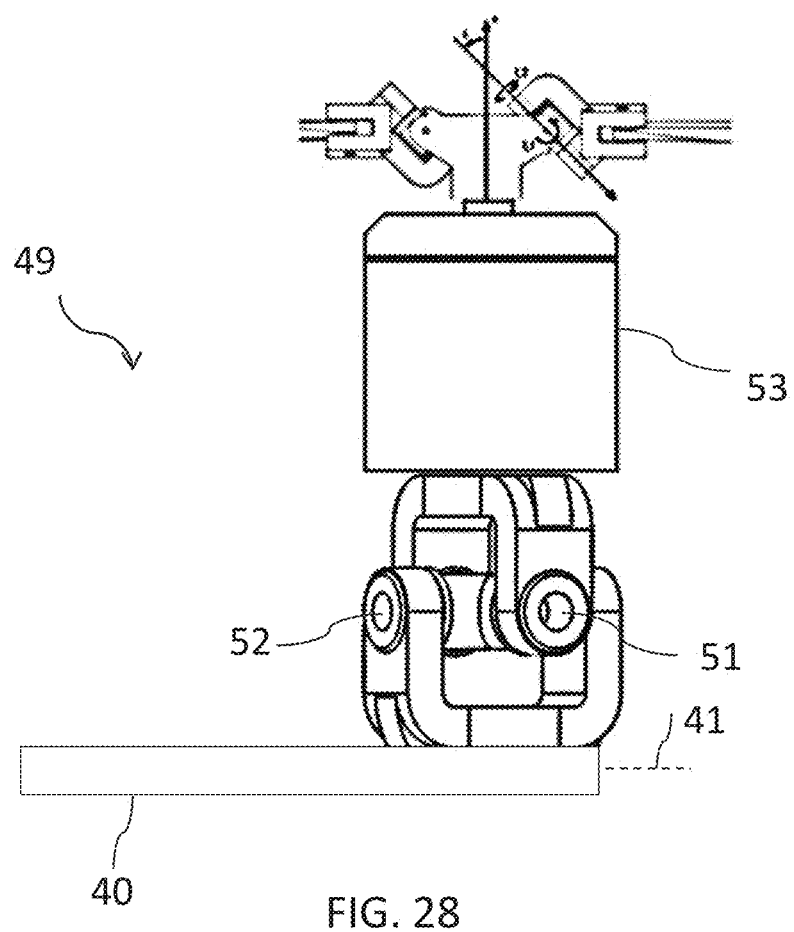
FIG. 28 is a front elevation view of a rotor system arm with a dual axis support mechanism with orthogonal pairs of opposite and parallel bearings for pivotally supporting a floating mast.

FIG. 28 show the rotor system arm 40 with a dual axis support mechanism 49 having a first pair of opposite and parallel bearings 51 and an orthogonal pair of opposite and parallel bearings 52 for pivotally supporting a floating mast 53 having a hinged rotor as described in aforementioned U.S. Pat. No. 9,914,535 to Pautlos.

Figure 29:
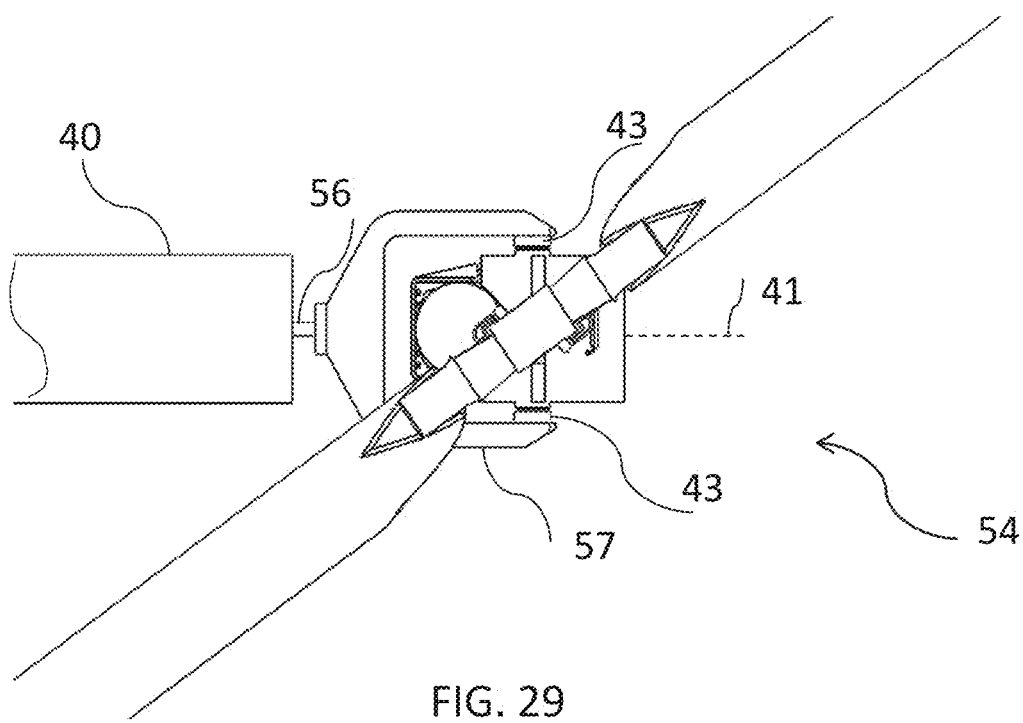
FIG. 29 is a top plan view of a rotor system arm with a dual axis support mechanism with bearings for pivotally supporting a floating mast.
Figure 30:
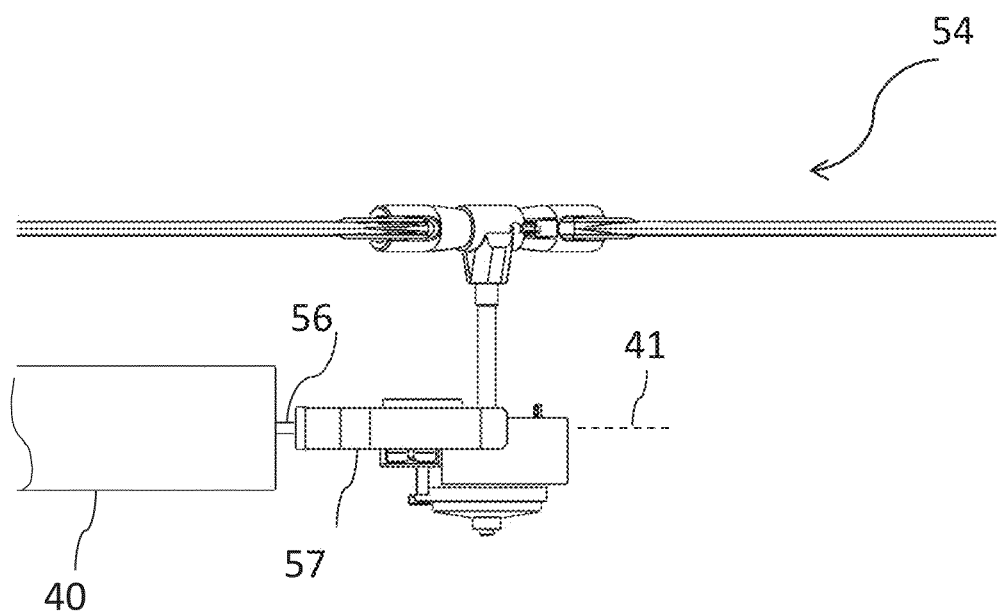
FIG. 30 is a front elevation view of the FIG. 29 rotor system arm.

FIG. 29 and FIG. 30 show the rotor system arm 40 with a dual axis support mechanism 54 having a bearing 56 along with the longitudinal rotor system arm centerline 41 for pivotally supporting a mast support 57 thereabout in a right side elevation view. The mast support 57 includes the pair of opposite and parallel bearings 43.

Figure 31:
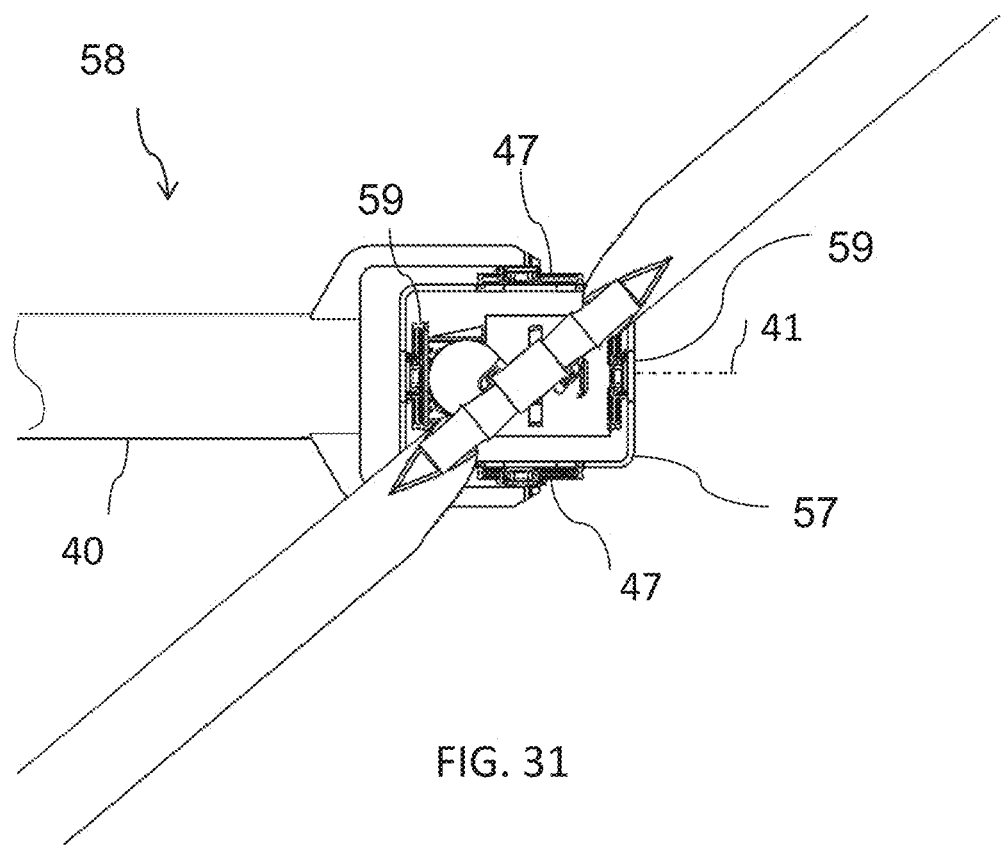
FIG. 31 is a top plan view of a dual axis support mechanism with two pairs of parallel rails for pivotally supporting a floating mast.
Figure 32:
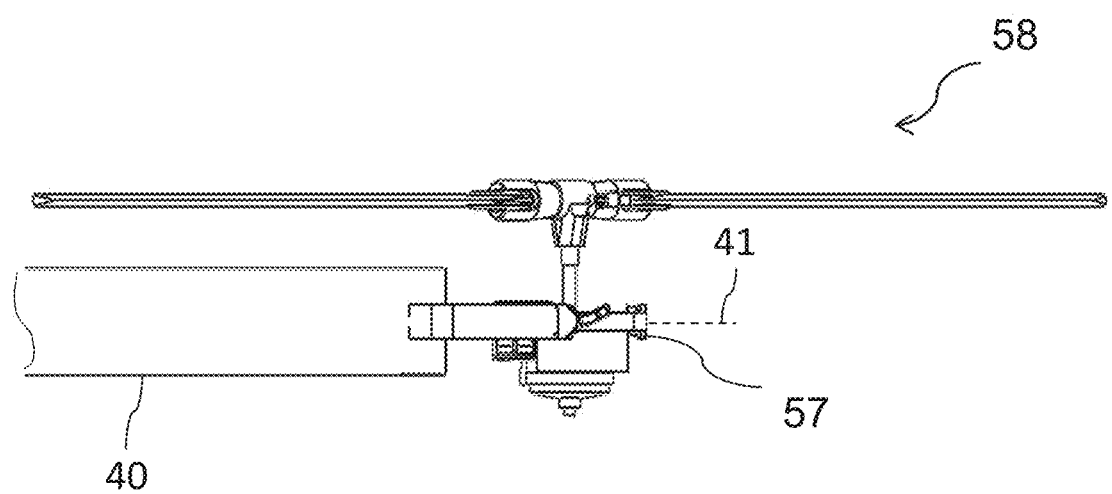
FIG. 32 is a front elevation view of the FIG. 31 rotor system arm.

FIG. 31 and FIG. 32 show the rotor system arm 40 with a dual axis support mechanism 58 having the pair of opposite and parallel curved rails 47 supporting a mast support 57 which in turn has a pair of opposite and parallel curved rails 59 perpendicular to the longitudinal rotor system arm centerline 41.

Section 3: Cyclic Rotor Blade Pitch Controls

Figure 33A:
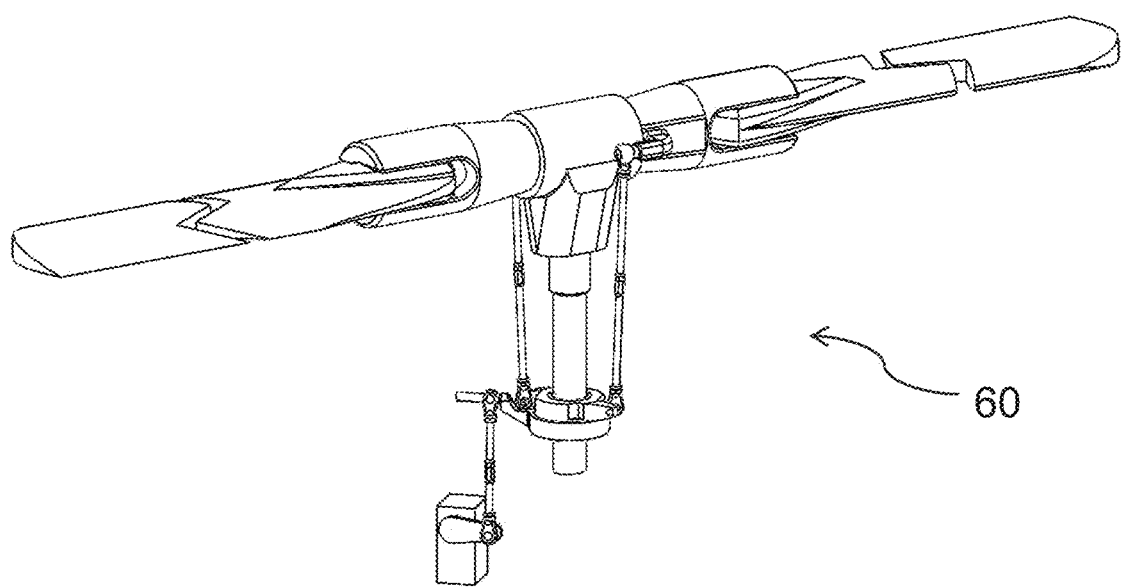
FIG. 33A is a pictorial view of a single servo swashplate mechanism for deployment with a single axis support mechanism for tilting a floating mast.
Figure 33B:
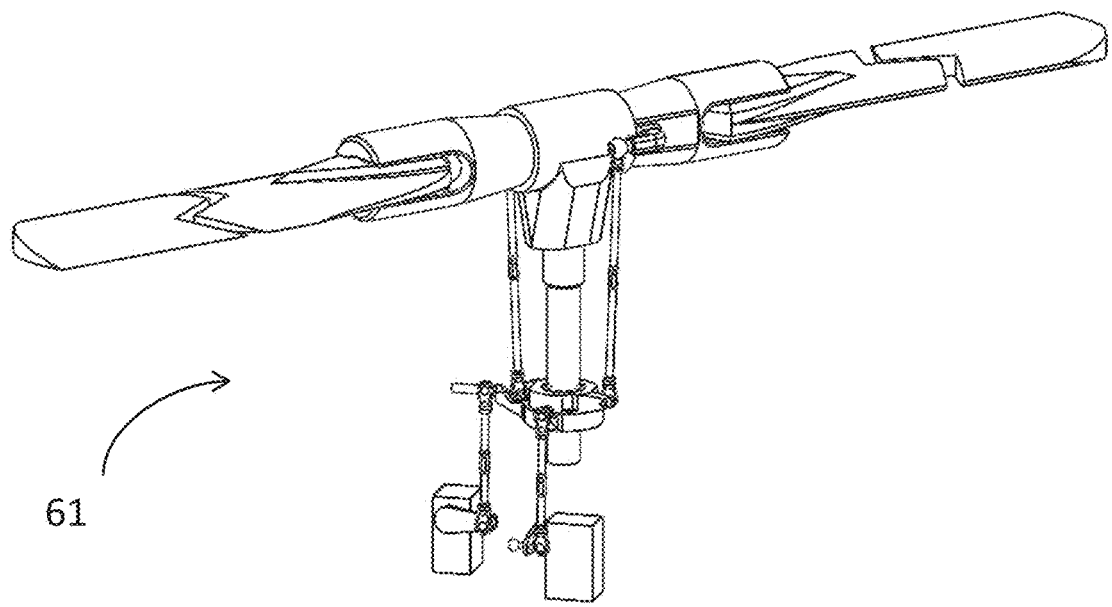
FIG. 33B is a pictorial view of a dual servo swashplate mechanism for deployment with a dual axis support mechanism for tilting a floating mast.
Figure 33C:
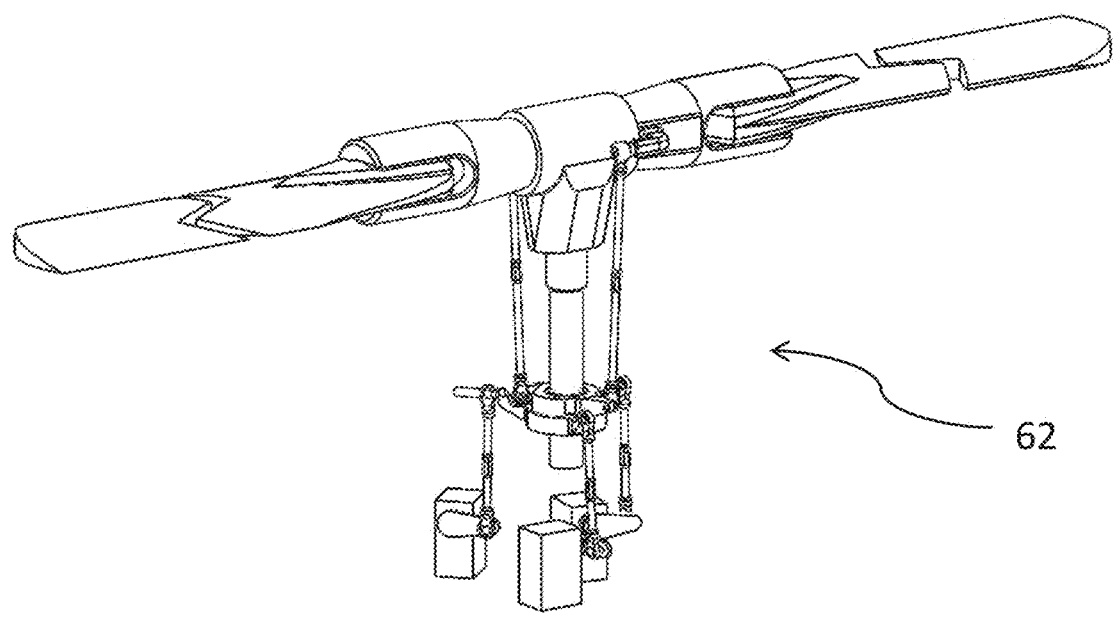
FIG. 33C is a pictorial view of a triple servo swashplate mechanism for deployment with a dual axis support mechanism for tilting a floating mast.
Figure 34:
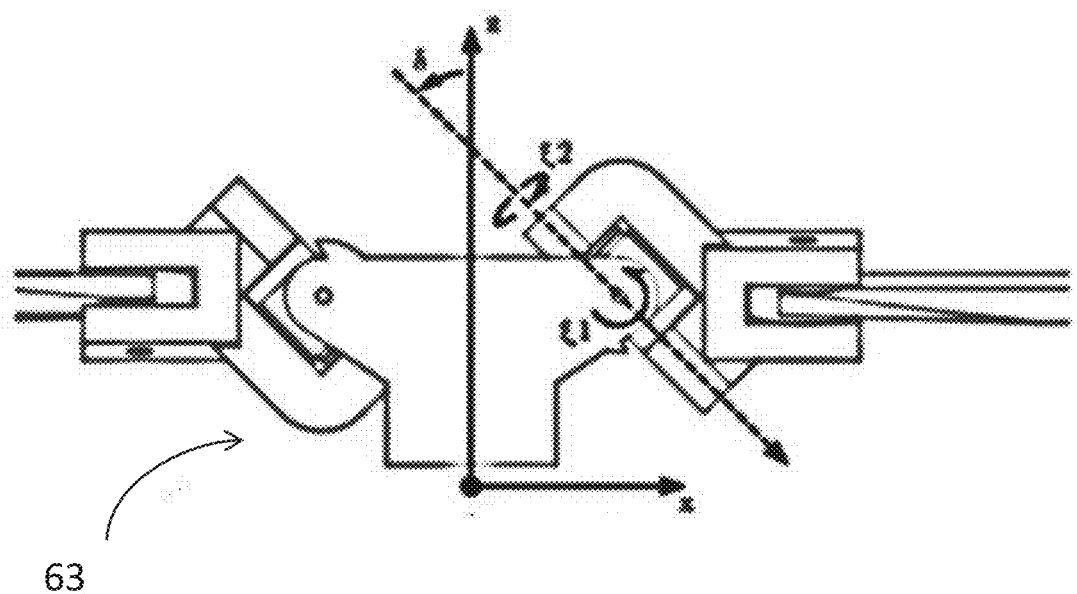
FIG. 34 is a pictorial view of a hinged rotor similar to U.S. Pat. No. 9,914,535 FIG. 6.

FIG. 33A to FIG. 33C and FIG. 34 show different cyclic rotor blade pitch controls for tilting a floating mast. FIG. 33A shows a single servo swashplate mechanism 60 for deployment with a single axis support mechanism. FIG. 33B shows a dual servo swashplate mechanism 61 for deployment with a dual axis support mechanism. Alternatively, the dual servo swashplate mechanism 61 can be employed for deployment with a single axis support mechanism and providing collective rotor blade pitch control of a floating mast. FIG. 33C shows a triple servo swashplate mechanism 62 for deployment with a dual axis support mechanism and also providing collective rotor blade pitch control of a floating mast. FIG. 34 shows a hinged rotor 63 as described in aforementioned U.S. Pat. No. 9,914,535 to Paulos as an alternative to servo swashplate mechanism for tilting a floating mast mounted on either a single axis support mechanism or a dual axis support mechanism.

Section 4: Rotorcraft with Forward Propulsion Unit

Figure 35A:
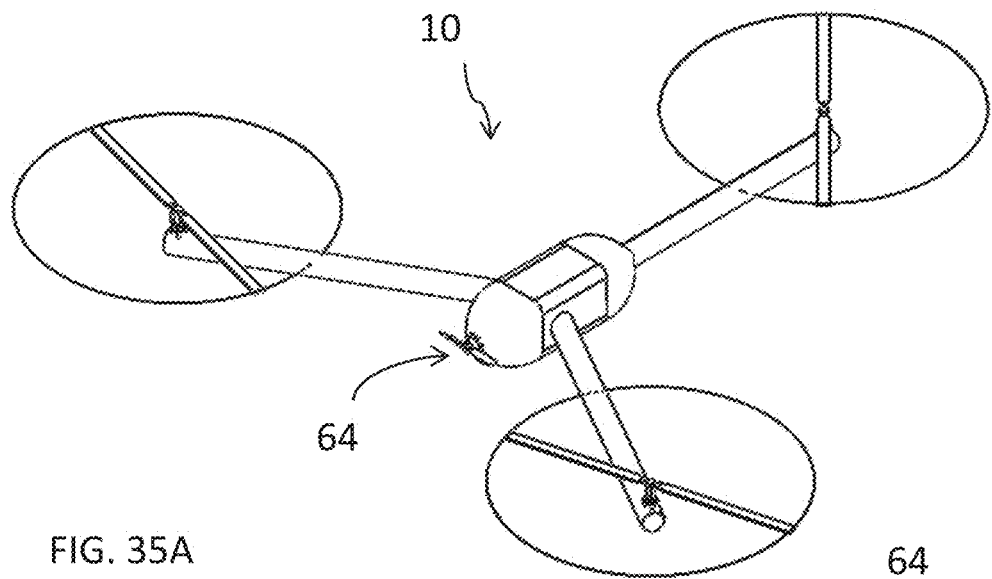
FIG. 35A is a schematic view of a tricopter with a forward propulsion unit.
Figure 35B:
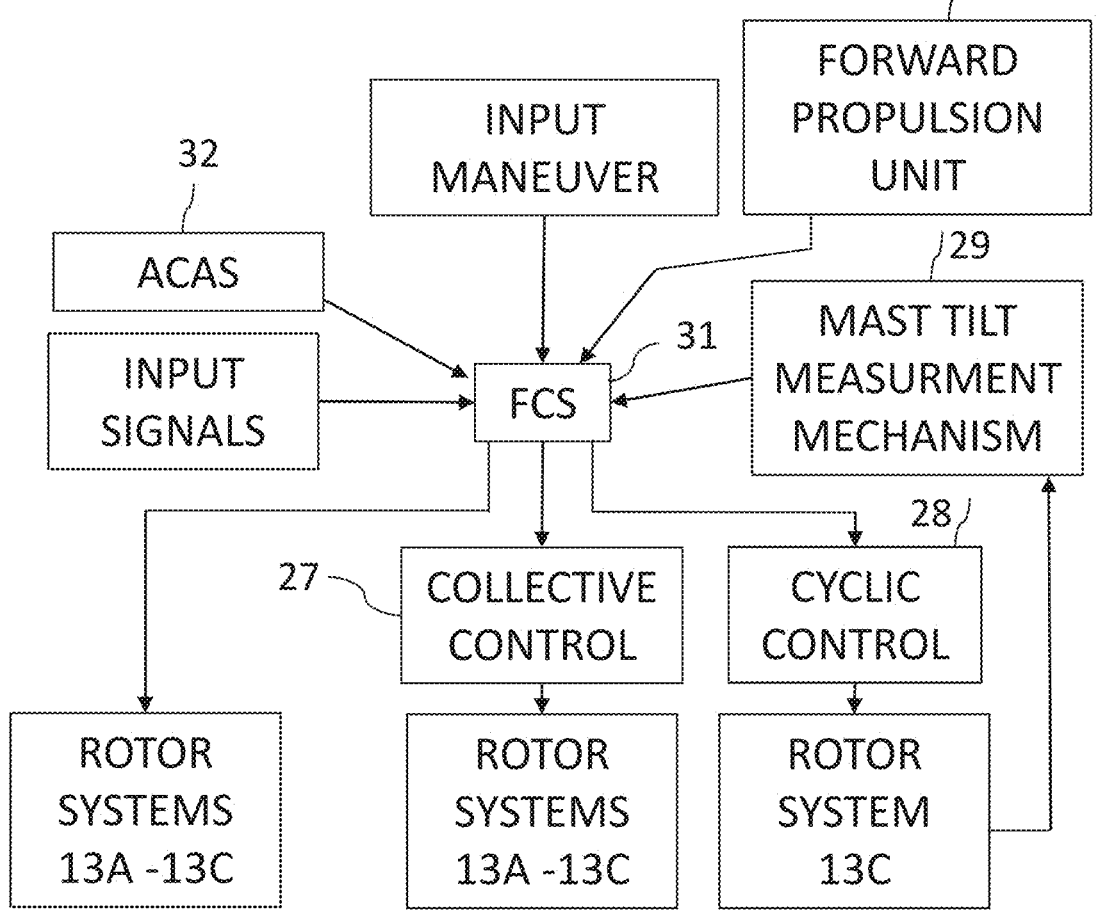
FIG. 35B is a block diagram of a flight control system of the FIG. 35A tricopter.
Figure 36A:
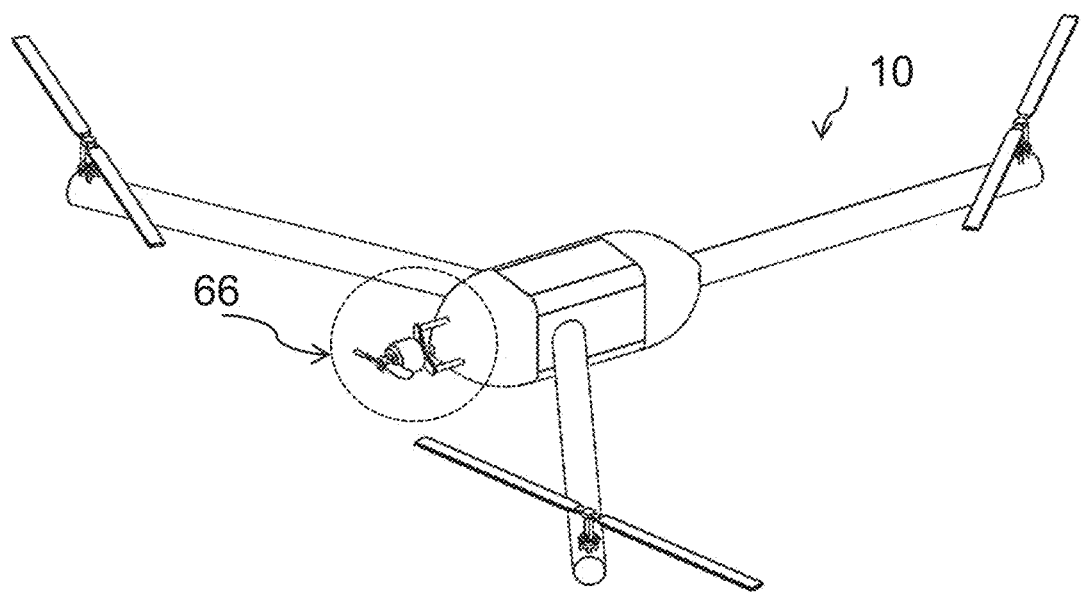
FIG. 36A is a pictorial view of a tricopter with a vectored thrust.
Figure 36B:
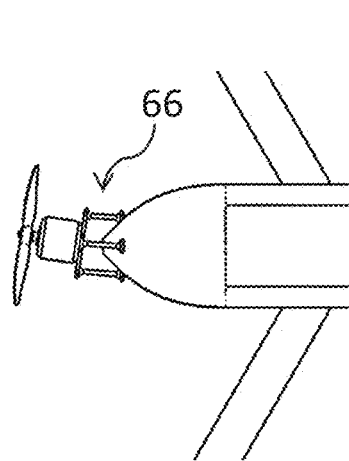
FIG. 36B is a pictorial view of the vectored thrust for right thrust.
Figure 36C:
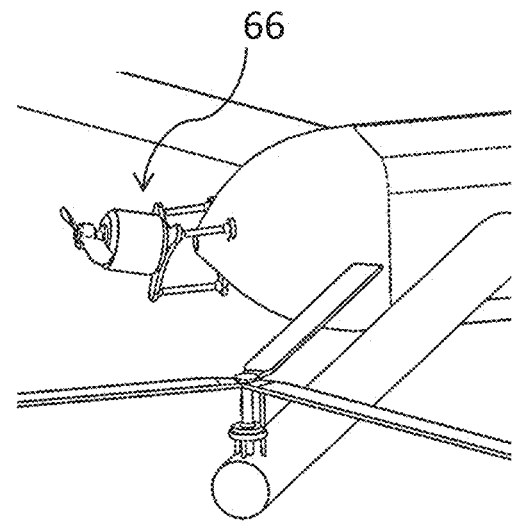
FIG. 36C is a pictorial view of vectored thrust for down thrust.

FIG. 35A and FIG. 35B show the tricopter 10 additionally including a forward propulsion unit 64 configured as a rear mounted pusher. Alternatively, the forward propulsion unit 64 can be implemented by two or more side mounted pushers, a front mounted puller or a combination thereof. The flight control system 31 also controls the forward propulsion unit 64 along with the rotor systems 13A-13C. FIG. 36A shows a vectored thrust rear mounted pusher 66 for improving handling qualities. FIG. 36B and FIG. 36C show vectored thrust rear mounted pusher 66 providing thrust in two exemplary directions: FIG. 36B shows right thrust generating counterclockwise torque and FIG. 36C shows down thrust resulting in pitching up torque.

The tricopter 10 has a pre-determined total take-off payload weight and an optimal flight speed for cruising flight at a non-descending altitude. The tricopter 10 at a predetermined total take-off payload weight has an overall drag at its optimal speed. The rotorcraft 10 with the forward propulsion unit 64's assistance is capable of straight and level gyro-cruising flight when the electric rotor motors 17A-17C of the rotor systems 13A-13C are powered upto 25% of their maximum power. The tricopter 10 can be provided with a more powerful forward propulsion unit 64 such that the tricopter is capable of straight and level gyro-cruising flight when the electric rotor motors 17A-17C of the rotor systems 13A-13C are not powered. The floating mast functionality allows gyro-cruising flight at a low platform angle of attack relative to air flow resulting in improved energy consumption.

Section 5: Rotorcraft Steering and Rotorcraft Maneuvers

Exemplary rotorcraft steering and rotorcraft maneuvers achievable by a rotorcraft with one or more floating masts are now described. For explanatory purposes, a Cartesian coordinate system is employed wherein forward flight is along the X axis and sideways flight is along the Y axis. Forward flight and/or sideways flight can be achieved without an entire rotorcraft having to be tilted as presently required with conventional rotorcraft, thereby affording considerably reduced drag. Furthermore, in the case of a rotorcraft having one or more lifting surfaces, greater lift efficiency can be achieved by controlling its fuselage's angle of attack which correspondingly changes the lifting surfaces' angle of attack. Moreover, responsiveness of a rotorcraft with one or more floating masts to a desired input maneuver is considerably quicker than responsiveness of a rotorcraft requiring its entire tilting for the same desired input maneuver. In the case of a rotorcraft having rotor systems without collective rotor blade pitch control, rpm control is employed for controlling a rotorcraft's inclination. In the case of a rotorcraft having rotor systems with collective rotor blade pitch control, a rotorcraft's inclination can be controlled by rpm and/or collective rotor blade pitch.

Traditional rotorcraft with three or more rotor systems has pairs of counter-rotating rotor systems. Accordingly, a traditional rotorcraft with an odd number of rotor systems has a resulting residual clockwise or counterclockwise torque.

Figure 37:
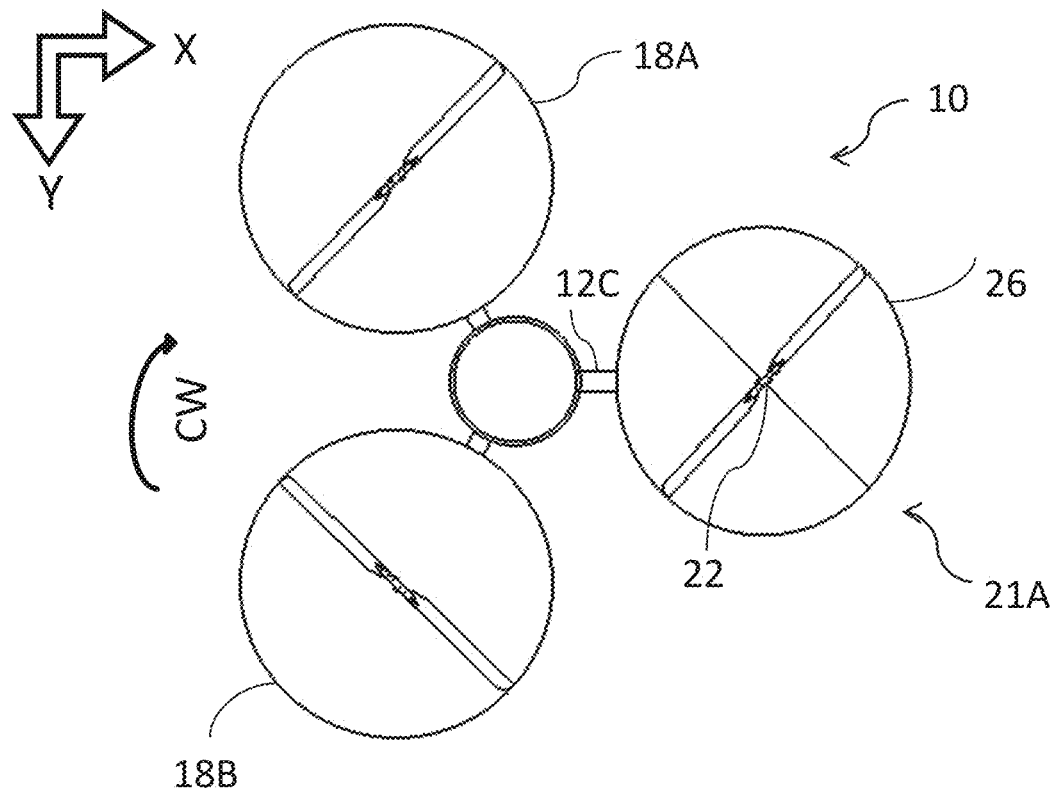
FIG. 37 is a top plan view of a tricopter with one single axis support mechanism for providing yaw.
Figure 38:
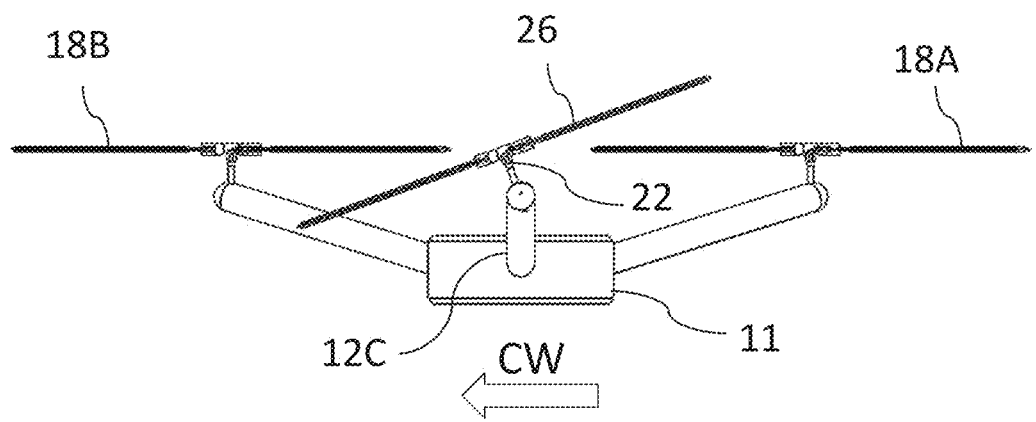
FIG. 38 is a right side elevation view of the FIG. 37 tricopter.

FIG. 37 and FIG. 38 show the tricopter 10 with a single axis support mechanism 21A for tilting the floating mast 22 to a desired tilt position for affording yaw shown an exemplary clockwise yaw. The rotor disc 26 has a higher rpm and/or higher collective rotor blade pitch than the rotor disc 18A and the rotor disc 18B to compensate for the floating mast 22's tilting and preclude tilting the fuselage 11. The yaw can also be provided by a dual axis support mechanism supporting the floating mast 22. The yaw can be more easily afforded by multiple floating masts.

FIG. 39 and FIG. 40 show the tricopter 10 with a dual axis support mechanism 21B for affording both yaw and pitch. The rotor disc 26 has a higher rpm and/or higher collective rotor blade pitch than the rotor disc 18A and the rotor disc 18B to compensate for the floating mast 22's tilting and preclude tilting the fuselage 11 as occurs in a traditional tricopter as shown in FIG. 41.

FIG. 42 to FIG. 47 show a quadcopter 70 with an increasing number of floating masts for progressively improving its steering. For illustrative purposes, the quadcopter 70 is provided with one or more single axis support mechanisms 21A. Two single axis support mechanisms 21A for pivotally supporting two floating masts in two different directions can be replaced by a dual axis support mechanism 21B.

Figure 42:
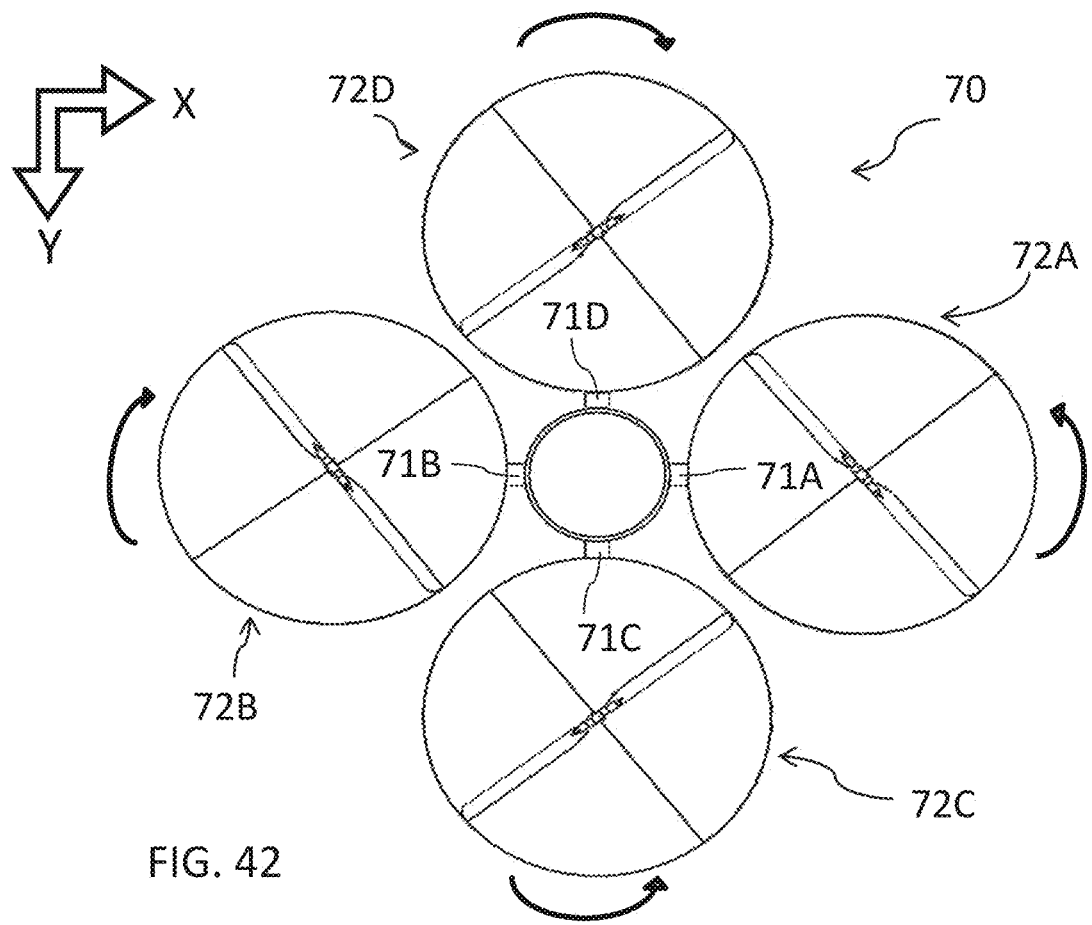
FIG. 42 is a top plan view of a quadcopter with one single axis support mechanism in forward flight.
Figure 43:
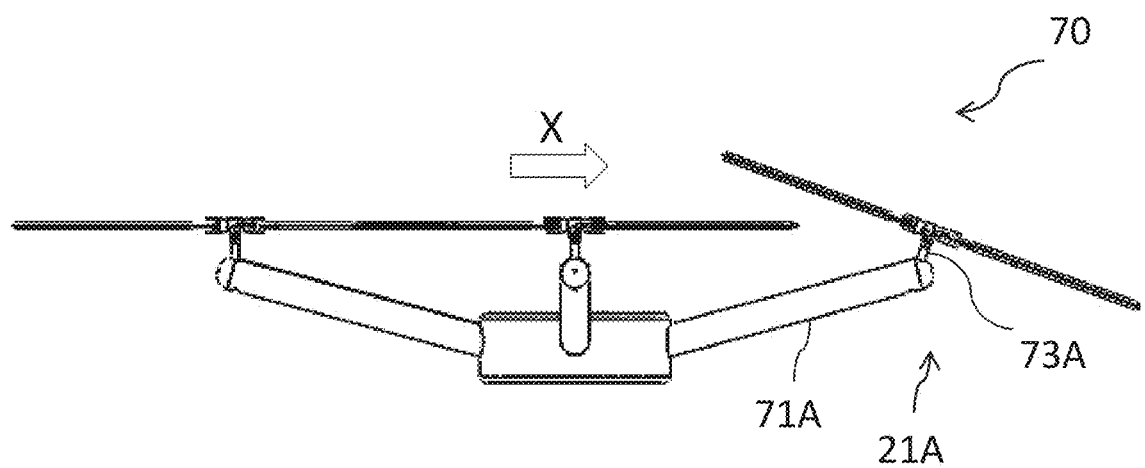
FIG. 43 is a front elevation view of the FIG. 42 quadcopter in forward flight.

FIG. 42 and FIG. 43 show a quadcopter 70 with four rotor system arms 71A-71D having a first pair of counter-rotating rotor systems 72A and 72B and a second pair of counter-rotating rotor systems 72C and 72D thereby resulting in a resultant zero torque. The rotor system arm 71A has a single axis support mechanism 21A for tilting a floating mast 73A therealong for facilitating forward flight. The rotor system 72A has a higher rpm and/or higher collective rotor blade pitch than the rotor systems 72B-72D to compensate for the floating mast 73A's tilting and preclude tilting the quadcopter 70.

Figure 44:
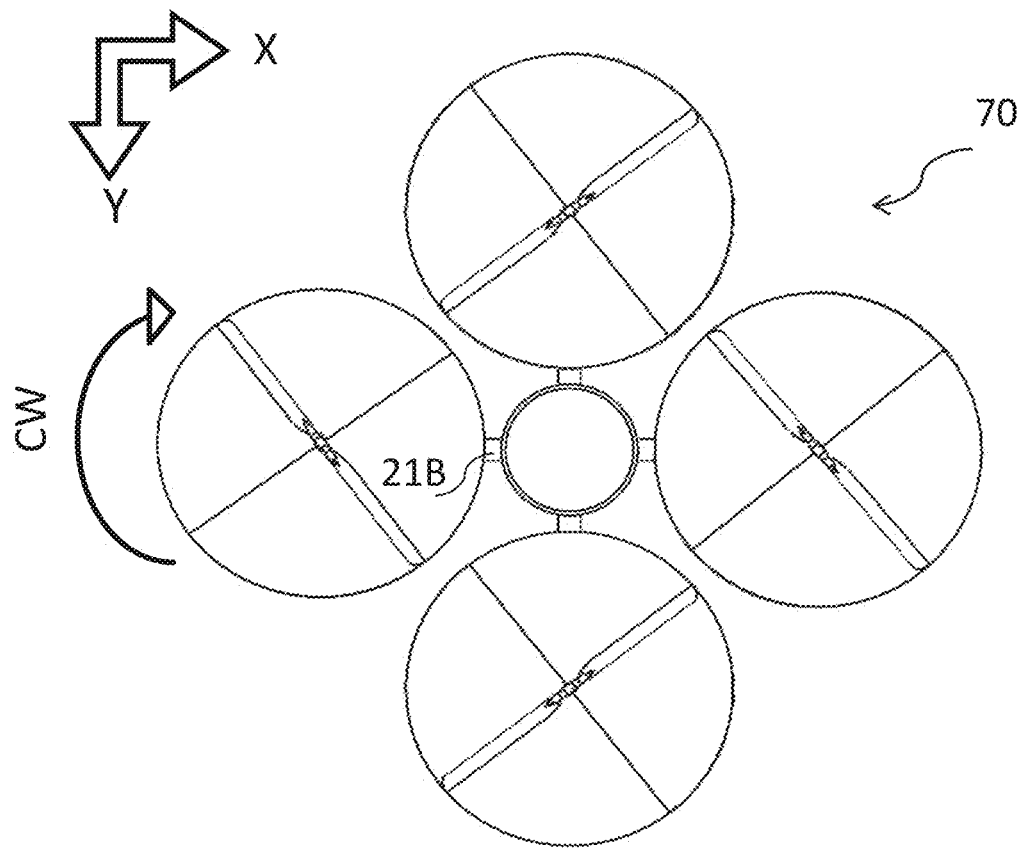
FIG. 44 is a top plan view of the FIG. 42 quadcopter with a second single axis support mechanism for providing yaw.
Figure 45:
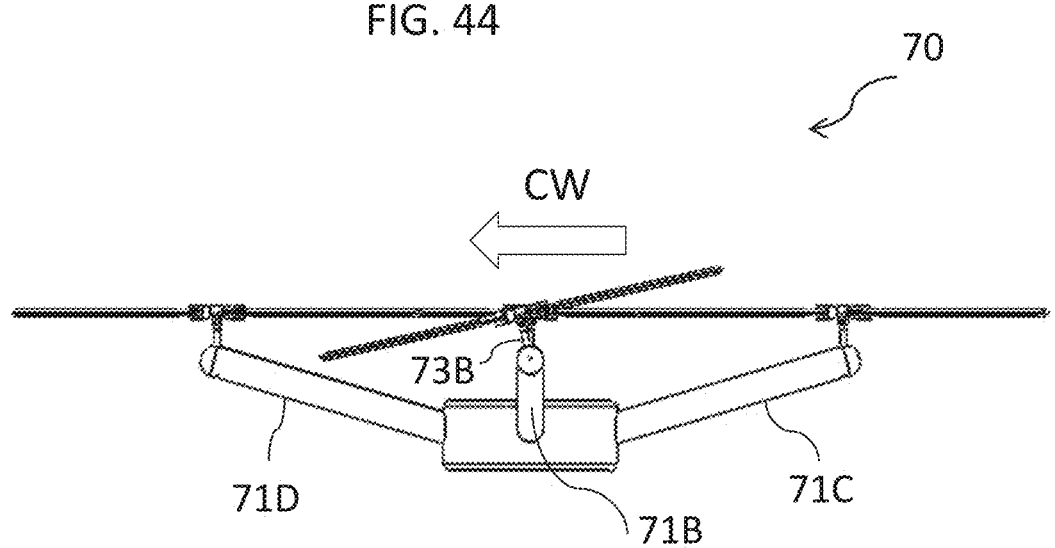
FIG. 45 is a left side elevation view of the FIG. 44 quadcopter.

FIG. 44 and FIG. 45 show the rotor system arm 71B has a single axis support mechanism 21A for tilting a floating mast 73B thereabout for affording yaw shown as exemplary clockwise yaw. The rotor system 72B has a higher rpm and/or higher collective rotor blade pitch than the rotor systems 72A, 72C and 72D to compensate for the floating mast 73B's tilting and preclude tilting the quadcopter 70.

Figure 46:
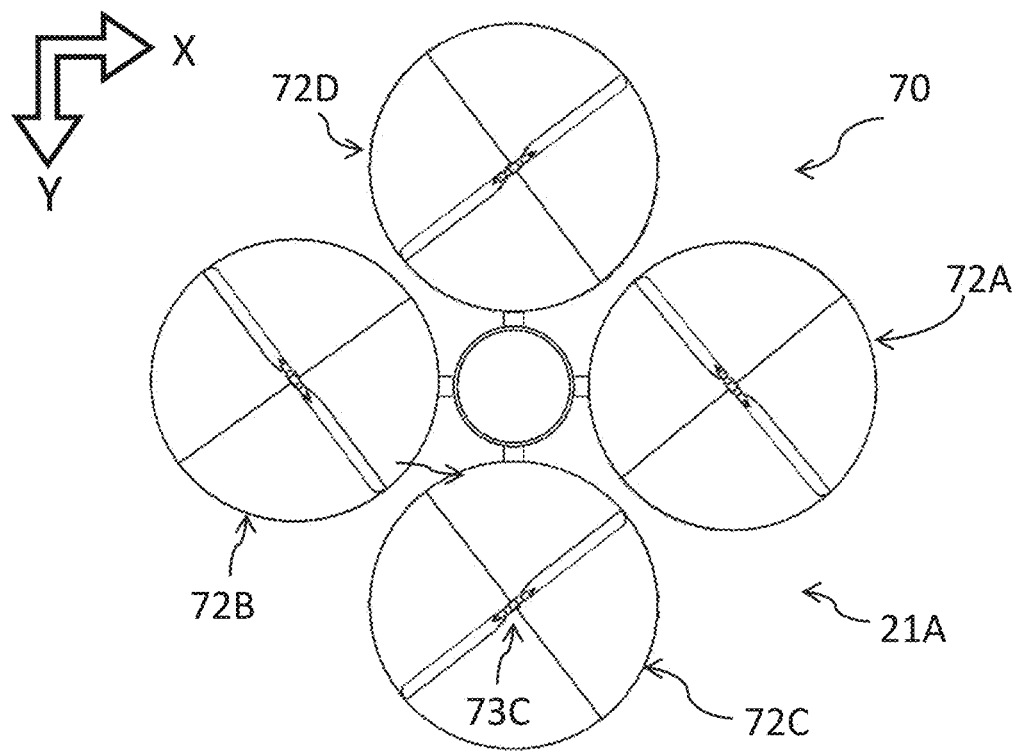
FIG. 46 is a top plan view of the FIG. 42 quadcopter with a third single axis support mechanism in sideways flight.
Figure 47:
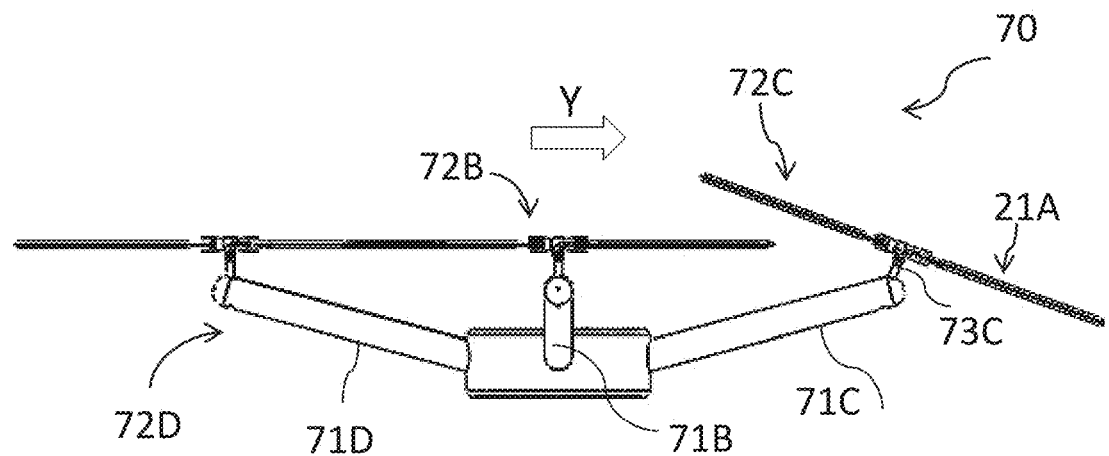
FIG. 47 is a left side elevation view of the FIG. 46 quadcopter.
Figure 48:
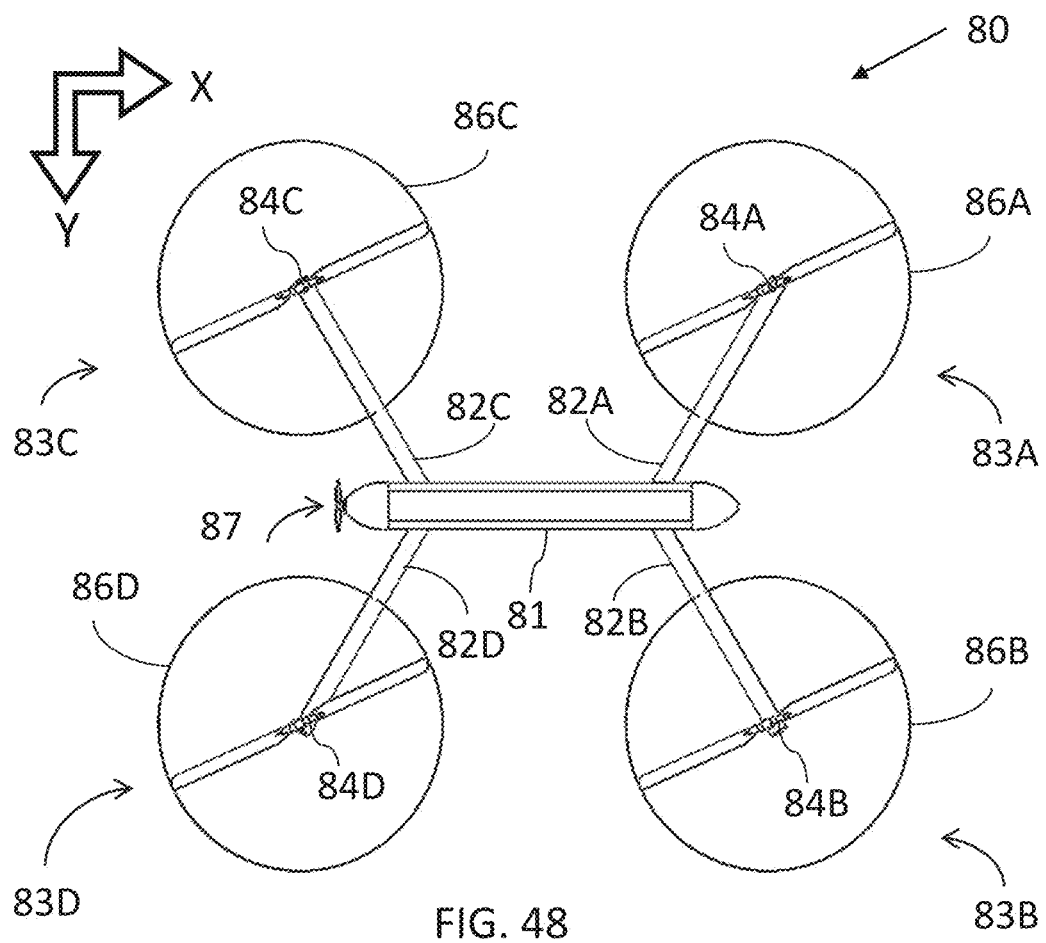
FIG. 48 is a top plan view of a quadcopter with four floating masts and a forward propulsion unit.

FIG. 46 and FIG. 47 show the rotor system arm 71C has a single axis support mechanism 21A for tilting a floating mast 73C there along for enabling sideways flight. The rotor system 72C has a higher rpm and/or higher collective rotor blade pitch than the rotor systems 72A, 72B and 72D to compensate for the floating mast 73C's tilting and preclude tilting the quadcopter 70.

FIG. 48 to FIG. 53 show a quadcopter 80 with a fuselage 81 and four rotor system arms 82A-82D each having a dual axis support mechanism 21B for correspondingly pivotally supporting rotor systems 83A-83D. The quadcopter 80 has four floating masts 84A-84D and rotating rotor discs 86A-86D including a pair of counterrotating rotor discs 86A and 86B and a pair of counterrotating rotor discs 86C and 86D. The quadcopter 80 includes a rear mounted pusher 87 similar to the rear mounted pusher 64.

Figure 49:
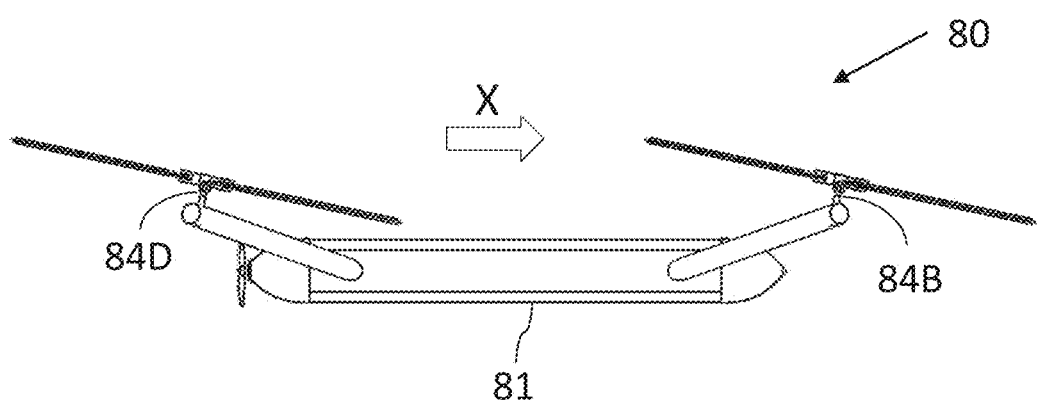
FIG. 49 is a front elevation view of the FIG. 48 quadcopter in forward flight.

FIG. 49 shows the quadcopter 80 in forward flight. The quadcopter's four floating masts 84A-84D are tilted forward with respect to the vertical for providing lift and forward thrust, thereby enabling the fuselage 81 to assume an aerodynamic efficient position, in this case, horizontal, for reducing drag. The forward propulsion unit 87 can optionally be operated.

Figure 50:
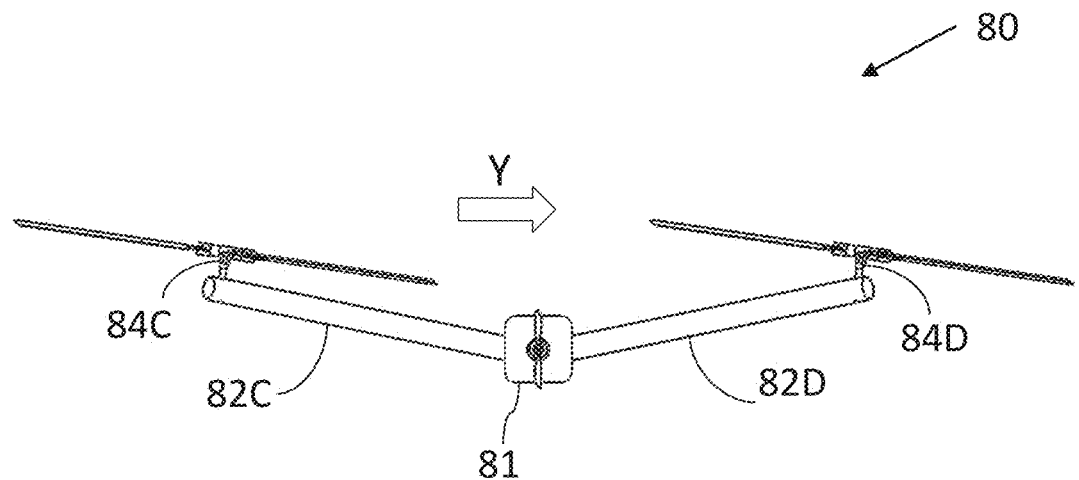
FIG. 50 is a left side elevation view of the FIG. 48 quadcopter in sideways flight.

FIG. 50 shows the quadcopter 80 in sideways flight. The quadcopter's four floating masts 84A-84D are tilted sideways with respect to the vertical for providing lift and sideways thrust, thereby enabling the fuselage 81 to assume an aerodynamic efficient position, in this case, horizontal, for reducing drag. The forward propulsion unit 87 can optionally be operated.

Figure 51:
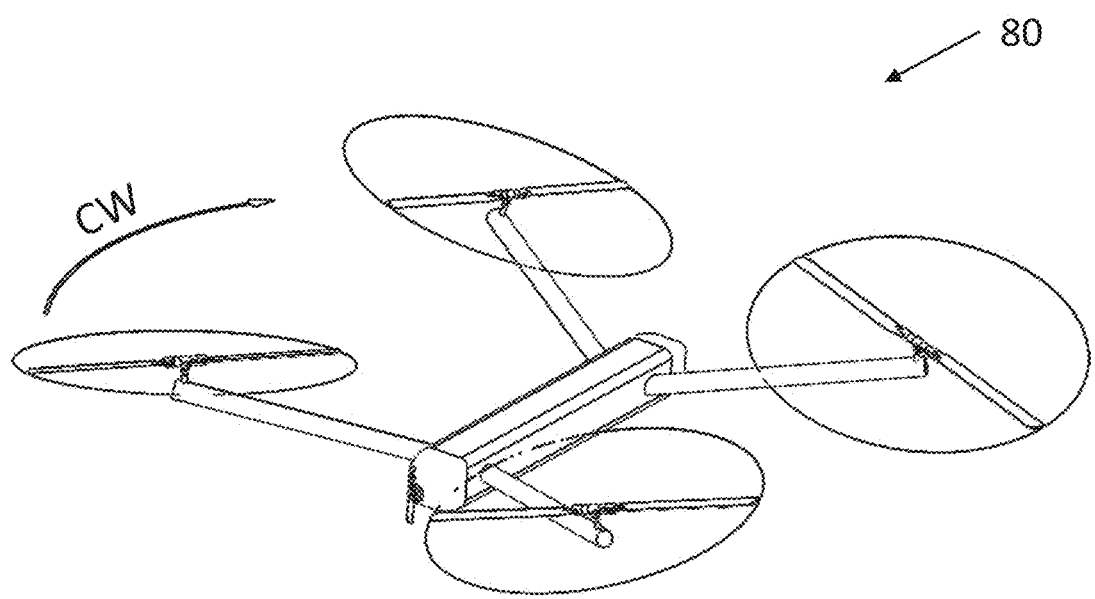
FIG. 51 is a perspective view of the FIG. 48 quadcopter turning clockwise.

FIG. 51 shows use of the four floating masts 84A-84D to turn the quadcopter 80 clockwise. The forward propulsion unit 87 can optionally be operated.

Figure 52:
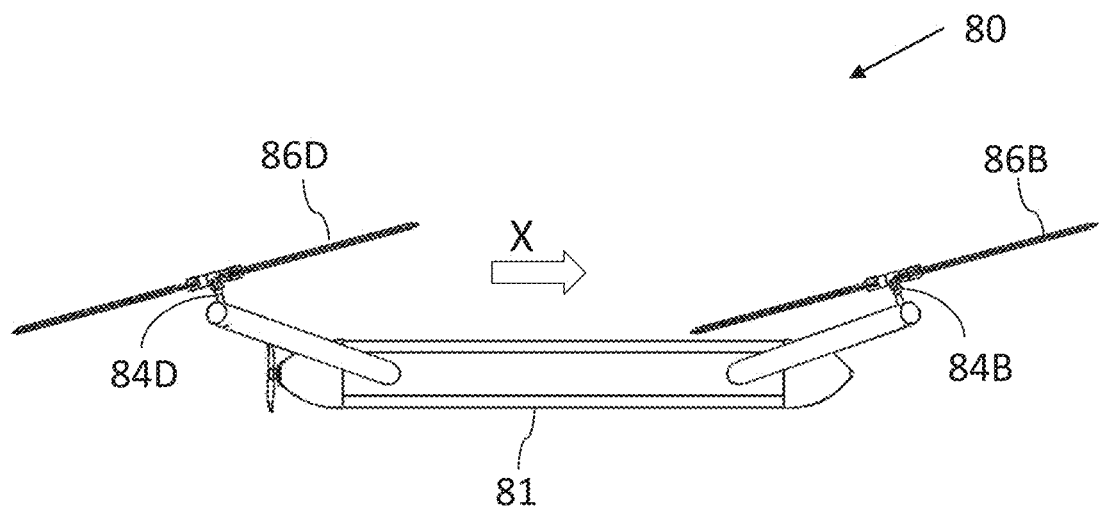
FIG. 52 is a front elevation view of the FIG. 48 quadcopter gyro-cruising forward.

FIG. 52 shows the quadcopter 80 in forward flight under gyro-cruising on operation of the forward propulsion unit 87. The floating masts 84A-84D are necessarily tilted backwards with respect to the quadcopter's forward flight such that their rotating rotor discs 86A-86D present a positive angle of attack for enabling their autorotation as opposed to being motor driven. The floating masts 84A-84D are preferably tilted for positioning the fuselage 81 in an aerodynamic efficient position, in this case, horizontal, for reducing drag.

Figure 53:
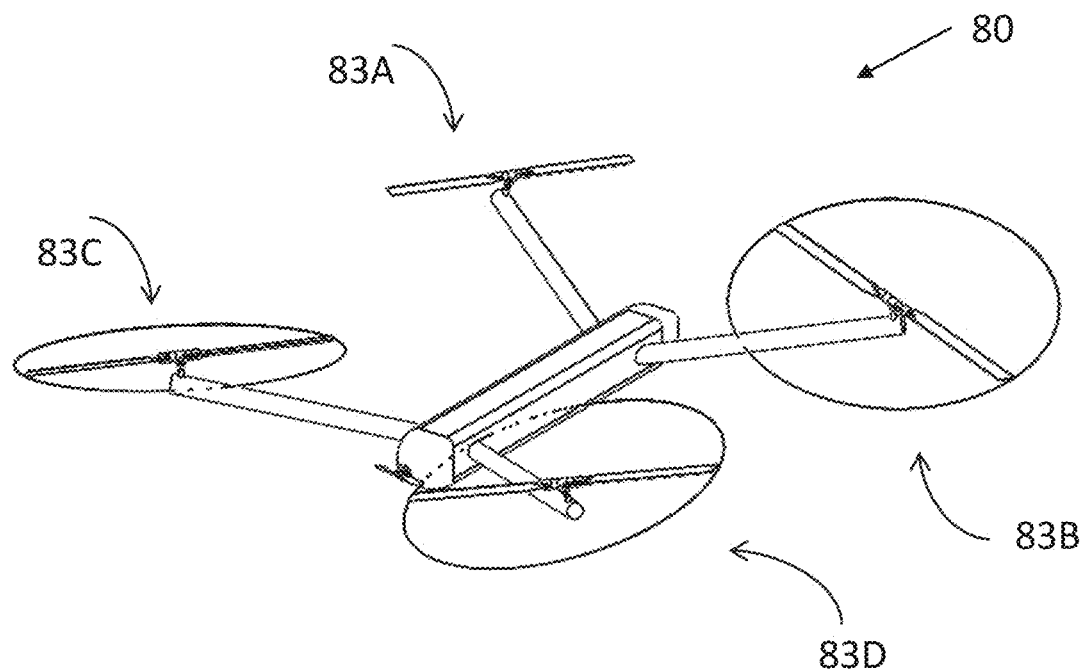
FIG. 53 is a perspective view of the FIG. 48 quadcopter flying on three rotor systems.

FIG. 53 shows the quadcopter 80 is capable for flying in the case of a catastrophic malfunction of a rotor system, in this case, the rotor system 83A. Loss of the rotor system 83A can be compensated by means of suitable cyclic control of the remaining rotor systems 83B, 83C and 83D.

Rotorcraft of the present invention also afford substantially vertical landing on inclined landing areas including inter alia open terrain, roofs, stationary or moving transportation means, and the like. Such vertical landing can be operator controlled, semi-automatic or fully automatic. Transportation means can be land-based or sea-based. Land-based transportation means can be stationary or moving. Sea-based transportation means are nearly continuously moving by virtue of wave action. Rotorcraft of the present invention necessarily require inclination details of a landing area for safe vertical descent thereon. In the case of open terrain, commercially available topographic maps include inter alia inclination details. Accordingly, a rotorcraft's flight plan can include landing at a destination with known topographic details. Otherwise inclination details of a landing area can be obtained by either on-board rotorcraft means or telemetry apparatus provided on a landing area for measuring and transmitting same to a rotorcraft intending to land thereon. The on-board rotorcraft means can be provided as part of a commercially available Airborne Collision Avoidance System (ACAS).

Landing on an inclined landing area involves changing a fuselage's inclination from being typically horizontal as its hovers above a desired landing area to substantially match the landing area's inclination. A fuselage's inclination can be changed either by way of rpm control and/or collective pitch. In the case of a conventional rotorcraft with fixed masts, such change would lead to a lateral displacement of the rotorcraft from its hovering position above a desired landing area. Rotorcraft of the present invention preclude such lateral displacement by simultaneous tilting of its one or more floating masts. Rotorcraft of the present invention preferably have each rotor system arm having a floating mast pivotally supported by a single axis support mechanism or preferably a dual axis support mechanism for landing on a stationary landing area. Landing on a landing area with a continuously changing inclination preferably requires that each floating mast is pivotally supported by a dual axis support mechanism.

Figure 54:
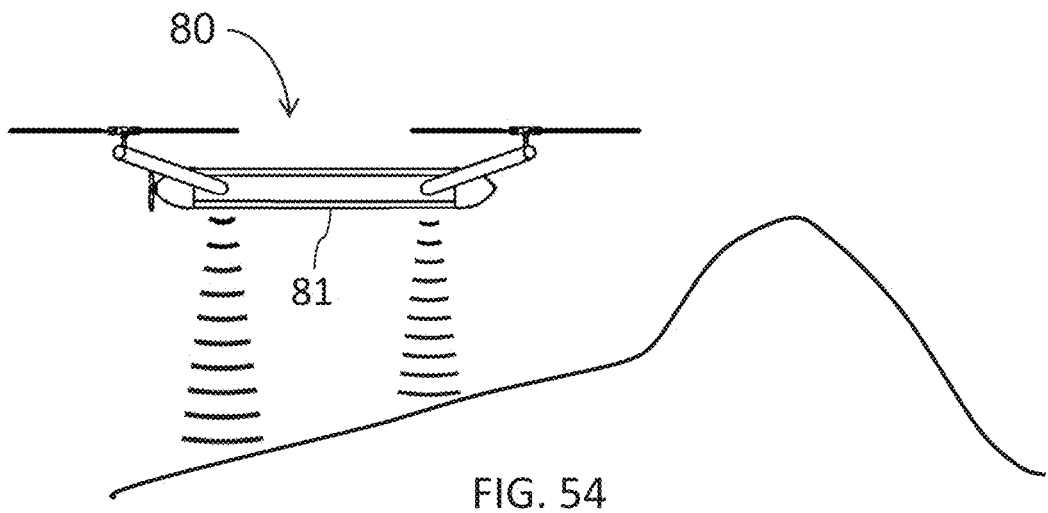
FIG. 54 to FIG. 56 show landing the FIG. 48 quadcopter on a landing area in open terrain.
Figure 55:
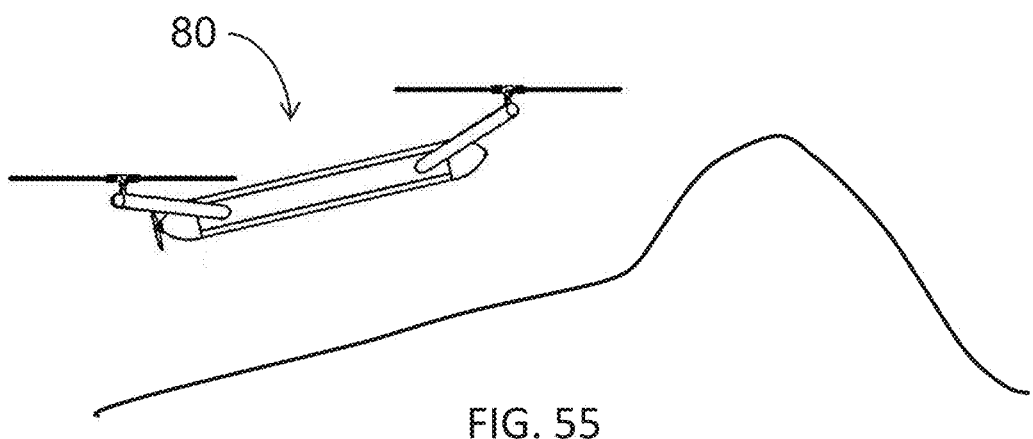
Figure 56:
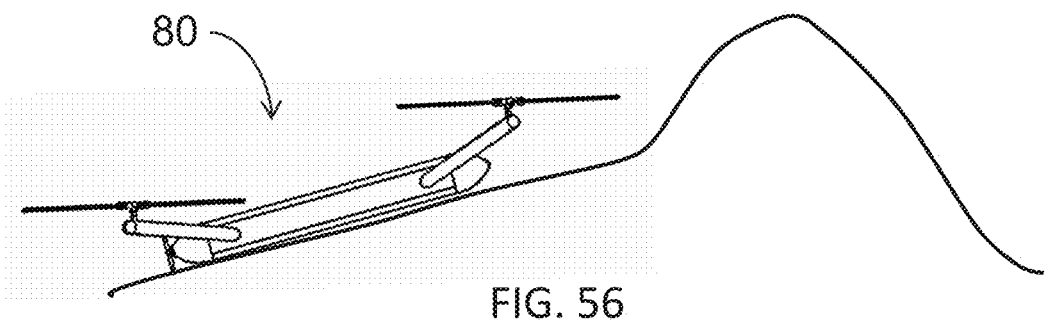

FIG. 54 to FIG. 56 show landing the quadcopter 80 on an inclined landing area in open terrain. The quadcopter 80 includes sensors for measuring distances to objects, for example, for collision avoidance. The quadcopter 80 can employ the same sensors for measuring distances to the landing area. FIG. 54 shows the quadcopter 80 hovering above the inclined landing area. The quadcopter's fuselage 81 is generally horizontal. FIG. 55 shows inclining the fuselage 81 compared to its FIG. 54 inclination to correspondingly match the inclined landing area. The fuselage 81's change of inclination is achieved by the front rotor systems have a higher rpm and/or collective rotor blade pitch than the rear rotor systems until the desired inclination is achieved. Simultaneously, the floating masts of the rotor systems undergo an opposing tilt to ensure that the quadcopter 80 stays substantially at the same position over the inclined landing area and doesn't fly backwards. FIG. 56 shows the quadcopter 80 landed on the inclined landing area.

Figure 57:
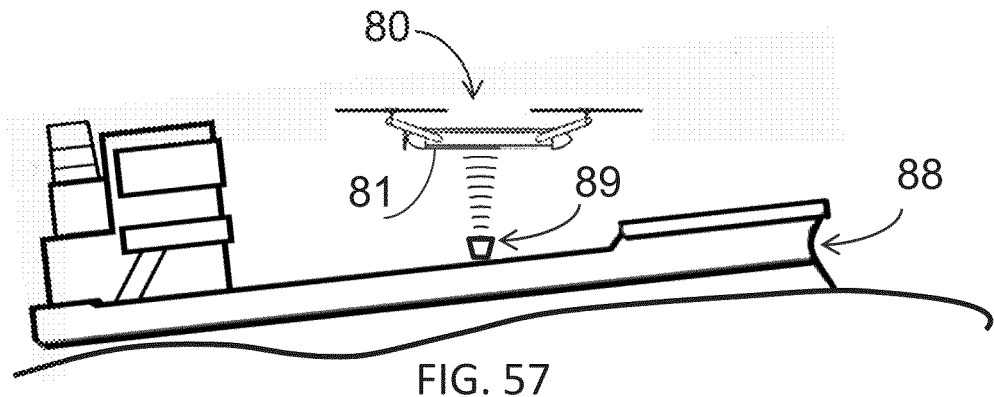
FIG. 57 to FIG. 59 show landing the FIG. 48 quadcopter on a landing area on a sea-based vehicle.
Figure 58:
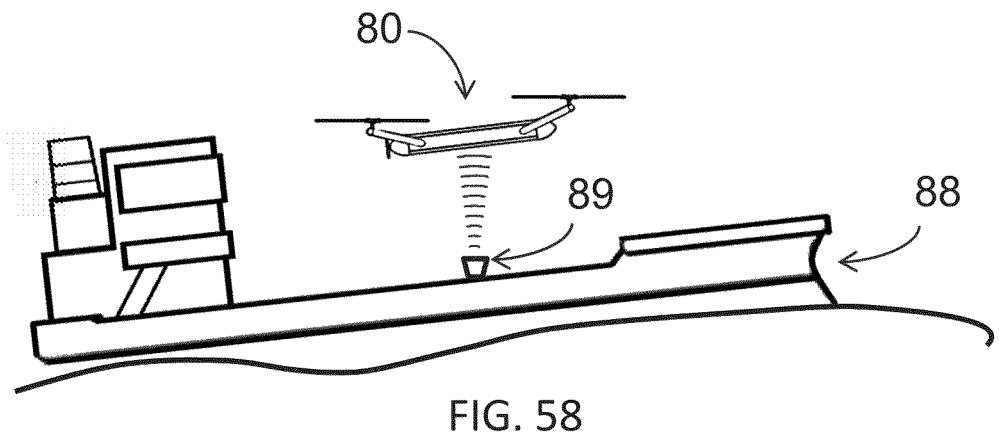
Figure 59:
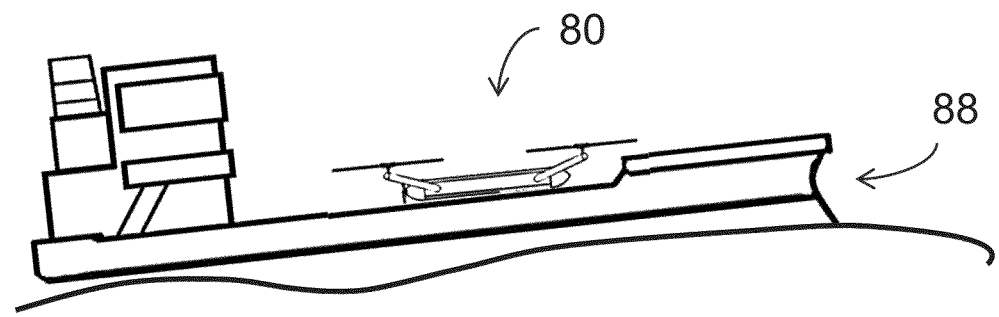

FIG. 57 to FIG. 59 show landing the quadcopter 80 on a landing area on a sea-based vehicle 88 which even under relatively calm conditions may lead to the landing area having a continuously changing inclination in at least one axis and generally two axes. The sea-based vehicle 88 includes telemetry apparatus 89 for real-time measuring its inclination details and transmitting same to the quadcopter 80 for enabling its safe substantially vertical descent on the landing area. Such real-time inclination details can supplement on-board ACAS functionality or replace same. FIG. 57 shows the quadcopter 80 hovering above the sea-based vehicle 88. FIG. 58 shows the quadcopter 80 continuously adjusting its fuselage 81's inclination to correspondingly match the sea-based vehicle 88's continuously changing inclination. Continuously matching the fuselage 81's inclination to the sea-based vehicle 88's continuously changing inclination until landing involves continuous control of rpm and/or collective rotor blade pitch and simultaneous tilt control of the quadcopter's floating masts to counter lateral displacements. FIG. 59 shows the quadcopter 80 landed on the sea-based vehicle 88.

Section 6: Technical benefits of Rotorcraft with Forward Propulsion Unit and One or More Floating Masts Rotorcraft with a forward propulsion unit and one or more floating masts have considerable technical benefits compared to conventional rotorcraft as summarized in the following table indicating a two-level grading system: Good and Medium. For illustrative purposes, rotorcraft with a forward propulsion unit and one or more floating masts are compared to a helicopter, a gyrodyne, a hybrid gyrodyne aircraft as disclosed in U.S. Pat. No. 10,046,853 to Vander Mey (hereinafter referred to as US '853 gyrodyne) and a VTOL rotorcraft as described in EP 2 990 332 A1 hereinafter referred to as EP '332 rotorcraft)

|  | Present invention | Helicopter | Gyrodyne | US '853 gyrodyne | EP '332 rotorcraft |
| --- | --- | --- | --- | --- | --- |
| Flight Redundancy | Good | None | None | None | None |
| Rotor system Redundancy | Good | None | None | None | Good |
| Cruising Energy Consumption | Good | Medium | Good | Good | Medium |
| Maximum flight speed Vne | Good | Medium | Medium | Good | Medium |
| Operation Weather Limitation | Good | Medium | Medium | Medium | Good |
| Safe Emergency Landing | Good | Good | Good | Medium | Medium |
| Landing on stationary inclined landing area | Good | None | None | None | None |
| Landing on landing area having continuously changing inclination | Good | None | None | None | None |

Flight Redundancy

Rotorcraft of the present invention have flight redundancy capability for cruising flight at a non-descending altitude, and also during climbing and descending. In case of power failure of one or more electric rotor motors, a FCS can control a rotorcraft by virtue of cyclic rotor blade pitch control. Conversely, in case of a power failure of a forward propulsion unit, a FCS can drive electric rotor motors to fly a rotorcraft of the present invention.

None of the helicopter, the gyrodyne, the US '853 gyrodyne, and the EP '332 rotorcraft has such flight redundancy capability. The helicopter and the EP '332 rotorcraft do not have a forward propulsion unit for providing forward thrust. The gyrodyne requires its one or more forward propulsion units for cruising flight, climbing, descending and hovering. The US '853 gyrodyne requires its protors for steering during cruising flight, climbing, descending and hovering.

Rotor System Redundancy

Rotorcraft of the present invention are controllable on the condition that at least one rotor system has a controllable cyclic rotor blade pitch. Accordingly, in the case of a rotorcraft with at least three rotor systems having at least two rotor systems with cyclic rotor blade pitch functionality, even if one of the rotor systems with cyclic rotor blade pitch functionality becomes inoperative, the rotorcraft can still be controlled and complete its flight to safe landing.

The EP '332 rotorcraft also has rotor system redundancy but the gyrodyne and US '853 gyrodyne do not have adjustable cyclic rotor blade pitch and therefore do not have rotor system redundancy Cruising Energy Consumption Maximum energy efficiency is achieved at a lowest platform angle of attack relative to air flow as possible by virtue of reducing total drag to a minimum. Rotorcraft of the present invention employs a forward propulsion unit for cruising and therefore can cruise at a low platform angle of attack relative to air flow.

In comparison to conventional rotorcraft, the present invention has comparable energy consumption to a gyrodyne and the US '853 gyrodyne during cruising. The former three have improved energy consumption relative to a helicopter and the EP '332 rotorcraft because the latter two do not have a forward propulsion unit and therefore require a higher platform angle of attack relative to air flow.

Maximum Flight Speed Vne

Maximum flight speed Vne is limited by stalling of a retreating rotor blade. Stalling occurs at a rotor blade's high angle of attack relative to air flow. Rotorcraft of the present invention gain air speed by increasing a forward propulsion unit's thrust rather than by forward cyclic rotor blade pitch thereby avoiding a high angle of attack of a retreating rotor blade.

In comparison to conventional rotorcraft, rotorcraft of the present invention have a maximum flight speed Vne comparable a gyrodyne and the US '853 gyrodyne. The former three have a higher maximum flight speed than a helicopter and the EP '332 rotorcraft because the latter two do not include a forward propulsion unit.

Operational Weather Limitation

Maneuverability of rotorcraft of the present invention depends on how many of their rotor systems enable individual or simultaneous adjustment of collective rotor blade pitch and cyclic rotor blade pitch. The greater the number of swashplate mechanisms the greater the maneuverability. The present invention is equally steerable when hovering and cruising at a non-descending altitude, and also when climbing and descending. The present invention's steering can be further improved by provision of vectored thrust means.

Present invention having multiple swashplate mechanisms: Grade Good

In comparison to conventional rotorcraft, the present invention has comparable maneuverability to the EP '332 rotorcraft. The former two are more maneuverable than a helicopter and a gyrodyne because the latter two have a single rotor system and are restricted to using their cyclic rotor blade pitch for rotorcraft roll and rotorcraft pitch. The former two are more maneuverable than the US '853 gyrodyne because the latter omits cyclic rotor blade pitch control.

Safe Emergency Landing

In case of power failures of both all electric rotor motors and the forward propulsion unit, full steering capability is maintained by virtue of at least one rotor system having a controllable cyclic rotor blade pitch. Safe emergency landings require both steering and autorotation. The present invention includes at least three rotor systems, at least one swashplate mechanism or alternative mechanism for enabling controllable cyclic rotor blade pitch of at least one rotor system, a forward propulsion unit, and preferably at least one freewheel arrangement.

In case the present invention does not include at least one freewheel arrangement, the present invention maintains steering and autorotation similar to the EP '332 rotorcraft and descends at a similar steep descent rate. The US '853 gyrodyne has a limited steering capability because it does not include swashplate mechanisms and also descends at a steep descent rate.

In case the present invention includes at least one freewheel arrangement, the present invention is capable of a safe emergency landing at a shallow descent rate similar to a helicopter and a gyrodyne.

Landing on Stationary Inclined Landing Area

A rotorcraft of the present invention is capable of a general vertical descent to land on a stationary inclined landing area by virtue of inclining its fuselage to be substantially parallel thereto without substantial horizontal movement relative to its generally vertical descent. In contradistinction, altering orientation of a conventional rotorcraft such that its fuselage is substantially parallel to a stationary inclined landing area, necessarily causes an undesirable horizontal movement due to a required change in its thrust vector.

Landing on Landing Area Having Continuously Changing Inclination

A rotorcraft of the present invention is capable of a general vertical descent to land on a landing area having a continuously changing inclination in at least one axis in a similar manner to landing on a stationary inclined landing area except that in this case the inclination of its fuselage is continuously changing to match the landing area's continuously changing inclination.

While the invention has been described with respect to a limited number of embodiments, it will be appreciated that many variations, modifications, and other applications of the invention can be made within the scope of the appended claims.

The invention claimed is:

1. A rotor system for use in a rotorcraft, the rotor system comprising:
   a) a mast having at least two rotor blades attached thereto for rotation by an electric rotor motor to act as a rotor disc,
   said rotor disc having a controllable cyclic rotor blade pitch; and
   b) a dual axis support mechanism for pivotally supporting said mast about dual pivot axes whereby said mast is a floating mast tiltable relative to a fiducial tilt position by said controllable cyclic rotor blade pitch.

2. The rotor system according to claim 1 wherein said dual pivot axes are orthogonal pivot axes.

3. The rotor system according to claim 1 wherein said dual axis support mechanism includes at least one bearing for pivotally supporting said floating mast about said dual pivot axes.

4. The rotor system according to claim 3 wherein said at least one bearing includes a bearing for pivotally supporting said floating mast about a first axis of said dual pivot axes and a pair of opposite and parallel bearings for pivotally supporting said floating mast about a second axis of said dual pivot axes.

5. The rotor system according to claim 3 wherein said at least one bearing includes a first pair of opposite and parallel bearings for pivotally supporting said floating mast about a first axis of said dual pivot axes and a second pair of opposite and parallel bearings for pivotally supporting said floating mast about a second axis of said dual pivot axes.

6. The rotor system according to claim 1 wherein said dual axis support mechanism includes at least one curved rail for pivotally supporting said floating mast about said dual pivot axes.

7. The rotor system according to claim 6 wherein said at least one curved rail includes a first pair of opposite and parallel curved rails for pivotally supporting said floating mast about a first axis of said dual pivot axes and a second pair of opposite and parallel curved rails for pivotally supporting said floating mast about a second axis of said dual pivot axes.

8. The rotor system according to claim 1 wherein said electric rotor motor is directly coupled to said floating mast such that said electric motor rotors tilts simultaneously with said floating mast.

9. The rotor system according to claim 1 wherein said electric rotor motor is stationary and coupled to said floating mast by a linkage mechanism.

10. The rotor system according to claim 1 and further comprising a mast tilt measurement mechanism for measuring tilt of said floating mast relative to said fiducial tilt position and provides a mast tilt feedback signal regarding same.

11. The rotor system according to claim 10 wherein said mast tilt feedback signal are gravitational measurements.

12. The rotor system according to claim 10 wherein said mast tilt feedback signal are relative to a rotor system arm supporting the rotor system.

* * * * *